US012205105B2

(12) United States Patent
Harrison

(10) Patent No.: US 12,205,105 B2
(45) Date of Patent: Jan. 21, 2025

(54) DECENTRALIZED TOKENIZATION TECHNOLOGIES

(71) Applicant: salesforce.com, inc., San Francisco, CA (US)

(72) Inventor: Daniel Thomas Harrison, San Francisco, CA (US)

(73) Assignee: Salesforce, Inc.

( * ) Notice: Subject to any disclaimer, the term of this patent is extended or adjusted under 35 U.S.C. 154(b) by 966 days.

(21) Appl. No.: 16/740,283

(22) Filed: Jan. 10, 2020

(65) Prior Publication Data

US 2021/0217001 A1    Jul. 15, 2021

(51) Int. Cl.
*G06Q 20/36* (2012.01)
*G06Q 20/40* (2012.01)

(52) U.S. Cl.
CPC ......... *G06Q 20/367* (2013.01); *G06Q 20/401* (2013.01); *G06Q 2220/00* (2013.01)

(58) Field of Classification Search
CPC ............... G06Q 20/367; G06Q 20/401; G06Q 2220/00; G06Q 20/065; G06Q 20/0658; G06Q 20/02; G06Q 20/3672; G06Q 20/3678; G06Q 20/3829; G06Q 20/389; G06Q 40/00; G06Q 20/3823; G06Q 10/10; G06Q 20/40; G06Q 20/3825; G06Q 20/405; G06F 21/30; G06F 21/645; G06F 21/6218; G06F 21/64; H04L 9/50; H04L 2209/56; H04L 9/3263
See application file for complete search history.

(56) References Cited

U.S. PATENT DOCUMENTS 5,577,188 A    11/1996    Zhu
5,608,872 A     3/1997    Schwartz et al.
(Continued)

FOREIGN PATENT DOCUMENTS

KR    20110005161 A  *  1/2011  ............. H04W 4/00
WO    WO-2014206316 A1 * 12/2014  ......... H04L 63/0892
(Continued)

OTHER PUBLICATIONS

Deloitte, Are Token Assets the Securities of Tomorrow, Feb. 2019, pp. 1-27.
(Continued)

*Primary Examiner* — Neha Patel
*Assistant Examiner* — Chunling Ding
(74) *Attorney, Agent, or Firm* — Lorenz & Kopf, LLP

(57) ABSTRACT

Disclosed embodiments are related to blockchain asset token management systems, and in particular, to Multiple Decentralized Tokenization with Personal Control (MDTPC). MDTPC allows users to determine how and when asset token evaluation is performed, and also allows users to determine which token management services they wish to use to manage and store their asset token and related data. In embodiments, multiple blockchain token management services are utilized in conjunction with individual digital wallets to share token data and validate ownership of tokens. A registry service is used to ensure visibility of tokens across multiple token management services, which increases the likelihood of identifying the rightful owner of asset tokens. Other embodiments may be described and/or claimed.

6 Claims, 8 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,480 B1 * | 6/2010 | Agresta ............... G06Q 10/06 705/28 |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,411,897 B2 * | 9/2019 | Paolini-Subramanya .......... H04L 63/123 |
| 10,754,972 B2 | 8/2020 | Efendiyev et al. |
| 10,805,309 B2 | 10/2020 | Harrison |
| 11,068,978 B1 * | 7/2021 | Ferreira ............... H04L 9/3239 |
| 11,301,834 B2 * | 4/2022 | Smets .................. G06Q 20/20 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |

(56) References Cited

U.S. PATENT DOCUMENTS

| | | |
|---|---|---|
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0294042 A1* | 12/2006 | Kapadia ............... G06F 16/954 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0216859 A1* | 8/2009 | Dolling ................ H04L 63/126 726/4 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2017/0223026 A1* | 8/2017 | Amiri .................... H04L 63/20 |
| 2019/0087822 A1* | 3/2019 | Vasu ................. G06Q 20/3276 |
| 2019/0236466 A1 | 8/2019 | Harrison |
| 2019/0340266 A1* | 11/2019 | Vo ...................... G06F 16/2365 |
| 2020/0019898 A1 | 1/2020 | Harrison |
| 2020/0027005 A1 | 1/2020 | Harrison et al. |
| 2020/0036514 A1* | 1/2020 | Christensen ........... H04L 63/12 |
| 2020/0090055 A1 | 3/2020 | Harrison |
| 2020/0242595 A1 | 7/2020 | Harrison |
| 2020/0259653 A1* | 8/2020 | Endress ............. G06Q 10/087 |
| 2020/0311273 A1 | 10/2020 | Knox et al. |
| 2020/0328899 A1* | 10/2020 | Glickshtein .......... G06Q 20/065 |
| 2020/0349564 A1* | 11/2020 | Padmanabhan ..... G06F 16/1824 |
| 2021/0011905 A1* | 1/2021 | Uhr ..................... H04L 9/0637 |
| 2021/0185283 A1* | 6/2021 | Kim ........................ G08B 3/10 |

FOREIGN PATENT DOCUMENTS

| | | | | |
|---|---|---|---|---|
| WO | WO-2020051710 A1 * | 3/2020 | | |
| WO | WO-2020092900 A2 * | 5/2020 | ........... | G06F 21/602 |
| WO | WO-2020092900 A3 * | 10/2020 | ........... | G06F 21/602 |

OTHER PUBLICATIONS

Enterprise Ethereum Alliance, Enterprise Ethereum Alliance Client Specification v4, Oct. 8, 2019, pp. 1-68.

Enterprise Ethereum Alliance, Enterprise Ethereum Alliance Off-Chain Trusted Compute Specification v1.1, Oct. 8, 2019, pp. 1-65.

Wood et al., Ethereum: A Secure Decentralised Generalised Transaction Ledger Byzantium Version, Oct. 20, 2019, pp. 1-39.

Finma, Guidelines for Enquiries Regarding the Regulatory Framework for Initial Coin Offerings (ICOs), Feb. 16, 2018, pp. 1-11.

Lamborghini et al., "Automotive Art and Street Art Com Together in the Aventador S by Skyler Grey at Monterey Car Week 2019", Press Release, Aug. 16, 2019, Monterey, California, pp. 1-3.

Poon, et al., "Plasma: Scalable Autonomous Smart Contracts", Aug. 11, 2017, pp. 1-47.

* cited by examiner

DECENTRALIZED TOKENIZATION TECHNOLOGIES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The present disclosure relates generally to database systems and blockchain/distributed ledger technologies, and in particular to asset tokenization using blockchain technologies.

BACKGROUND

A blockchain is a shared or distributed ledger that records transactions such as orders, payments, activities, and the like. The blockchain or ledger is a list of records (referred to as "blocks") that are linked using cryptography, where each block generally includes a cryptographic hash of the previous block, a timestamp, and transaction data. Each participant of a blockchain has their own version of the ledger, and thus, a version of the truth that may differ from other participants. For use as a distributed ledger, a blockchain is typically managed by a peer-to-peer network collectively adhering to a protocol for inter-node communication and validating new blocks. Some nodes validate transactions, generate new blocks based on each validated transaction, and broadcast the new blocks to other nodes for addition to their local versions of the blockchain. Once recorded, the data in any given block cannot be altered retroactively without alteration of all subsequent blocks, which requires consensus of the network majority. Blockchain technologies may be used for asset tokenization management.

However, tokenization of assets only allows asset tracking on a single ledger (blockchain), and a single ledger is unlikely to be recognized across multiple regions or companies. Additionally, tokenization for ownership does not provide individual users with control of how the asset is managed or how historical data is shared. With existing technologies evaluation is based on smart contracts or sharing the public key of a token. However, the visibility of public and private/permissioned chains still means that a user may lose some degree of privacy and control on how asset data is shared. Furthermore, since multiple blockchains are used to track and manage different types of assets, it is difficult for users to determine which blockchains they should use to manage their own assets, or to discover information about assets they wish to purchase.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
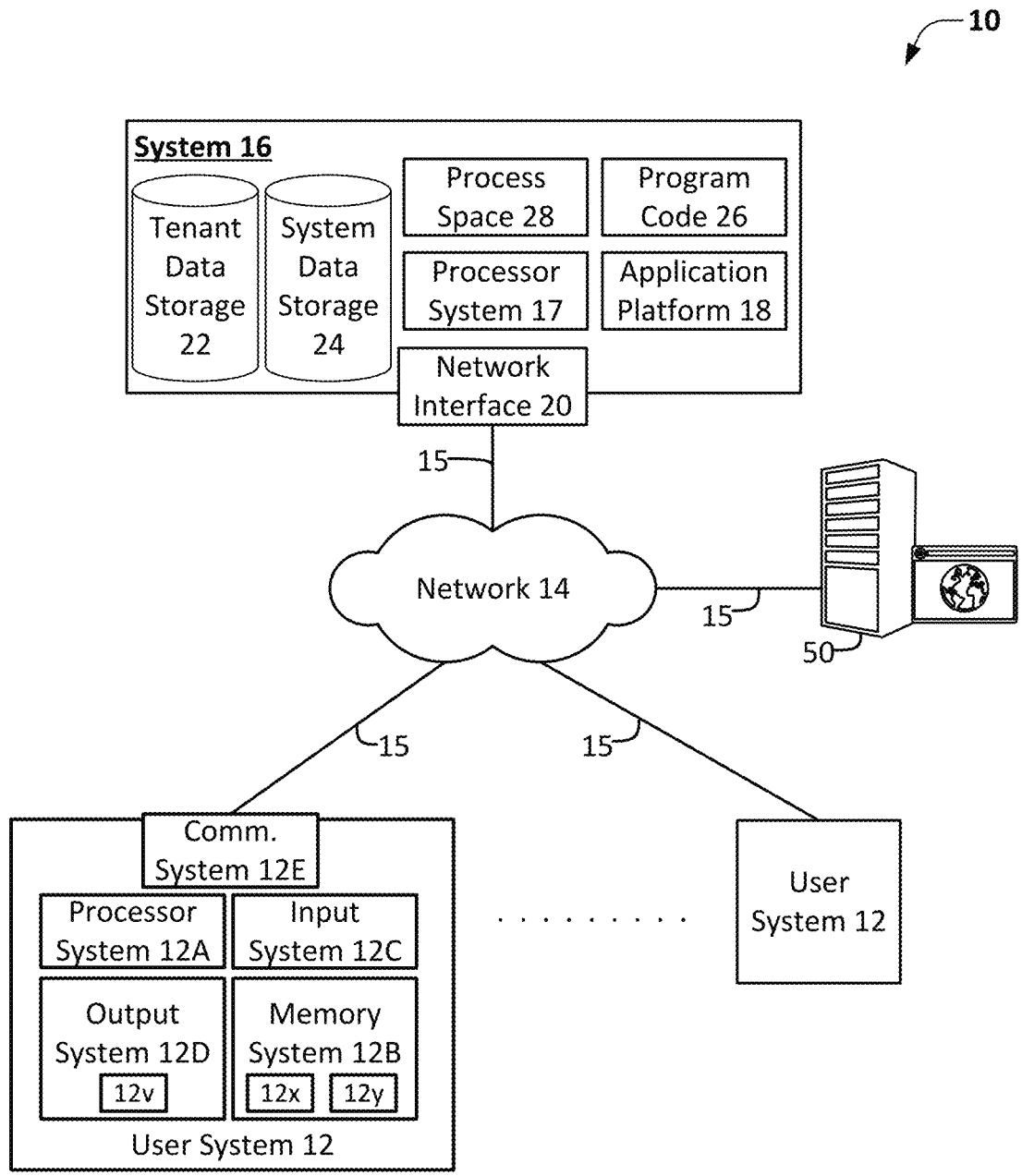
FIG. 1A shows an example environment in which an on-demand database service can be used according to various embodiments.

Disclosed embodiments are related to blockchain asset management systems implementing Multiple Decentralized Tokenization with Personal Control (MDTPC). Tokenization refers to the process of substituting a sensitive data element with a non-sensitive equivalent (referred to as a "token") that retains all the essential information about the data without compromising its security. The token is a reference, code, or identifier that maps back to the sensitive data through a tokenization system. The mapping from original data to a token uses methods which render tokens infeasible to reverse in the absence of the tokenization system, for example, using tokens created from random numbers. The tokenization system provides data processing applications with the authority and interfaces to request tokens, or detokenize back to sensitive data.

In the context of asset management, the tokenization process converts rights to an asset into a digital token. The "rights" to an asset may be in the form of a physical ownership, title, deed, share or stock certificate, authenticity certificate, or the like. Asset tokens represent assets such as total or partial participation in ownership of real physical objects, companies, earnings streams, an entitlement to dividends or interest payments, virtualized objects in games or simulated environments, and even the rights to a specific action. In terms of their economic function, asset tokens are sometimes considered analogous to equities, bonds, or derivatives. Additionally, asset tokens are sometime regarded or considered to be a form of securities, which means that the trade of asset tokens may have to conform to securities law requirements. Nevertheless, asset tokens can be stored and managed in a blockchain.

An advantage of using blockchain for asset management is that transactions performed on a blockchain are immutable, which means that the transactions cannot be changed or altered without permission from the network. This creates an accurate and nearly unchangeable record for assets that can be used to verify each transaction, such as each transfer of title or ownership. Additionally, the blockchain makes sharing the transaction history across multiple parties more fluid and flexible.

Blockchain tokenization of assets only allows asset tracking on a single ledger (blockchain), and a single ledger is unlikely to be recognized across multiple regions or companies. Additionally, tokenization for ownership does not provide individual users with control of how the asset is managed or how historical data is shared. With existing technologies, evaluation is based on smart contracts or sharing the public key of a token. However, the visibility of public and private/permissioned blockchains still means that a user may lose some degree of privacy and control over how asset data is shared. Furthermore, since multiple blockchains are used to track and manage different types of assets, it is difficult for users to determine which tokenization services they should use to manage their assets. It is also difficult for users to discover information about assets they wish to purchase.

Embodiments herein introduce the concept of MDTPC, which allows users to determine how and when asset evaluation is performed, and also allows users to determine which blockchains they wish to use to manage and store their asset data. In embodiments, multiple blockchain tokenization systems are utilized in conjunction with individual wallets to share the tokenization. Additionally, a Registry Service is used to ensure visibility of tokens across multiple blockchains, which increases the likelihood of identifying the rightful owner of an asset.

In embodiments, an individual who is interested in buying an asset, or verifying the provenance of an asset, posts the request to investigate ownership of a particular asset rather than transfer of the asset. Asset verification for conventional blockchain transactions takes place by reading the data on the blockchain. By contrast, embodiments involve requesting the token service (blockchain) for ownership information of an asset, and the token service digitally signs the request. Posting the request in the wallet initiates the request securely but does not guarantee the owner's information will be exposed. The cryptographically signed request is then posted to the token service (blockchain) when the ownership of the asset is verified. The specific token service(s) (blockchain(s)) that the signed request is to be posted may be identified by the token itself. Alternatively, requesting wallet may query the registry service with various fields to identify which specific token service(s) (blockchain(s)) that the signed request is to be posted. The requesting wallet may post the request to each of the personally identified token service and the registry service identified token service. After the request is posted to each of the identified token services, each of the token services are queried for the subject of the request, and return a confirmation, identifier, and/or block data to the registry service if the subject of the request is found in their respective blockchains. In some embodiments, the token services notify the subject(s) of the request (e.g., the wallet of the owner of the asset), and the owner wallet can determine whether to provide the confirmation/identifier to the requesting wallet. If the owner does not want to share their details and/or does not expect a request for proof of ownership, the owner can indicate that they have the asset and deny access to any additional information. The response from the owner wallet would allow the requesting wallet to have concurrence between the physical asset and the known token services. Once the Token Services have confirmation from the owning wallet on the level of detail to provide, they each send their data back to the requesting wallet, either directly or through the registry service.

In some embodiments, the signed request that is posted to individual token services may list all of the token services that are to receive the signed request. For example, if the registry service discovers 1-N token services that might have the token for a particular asset, the request will list each of the 1-N token services. When the owning wallet is notified of the request, the owning wallet will receive the list of token services. This allows the owning wallet to discover new token services to which they should register the token for this particular asset. Since the owning wallet is now aware of the new token services for registering their asset, the owning wallet can confirm whether the original token service that registered the asset token is actually the right type of token service register the asset token. Additionally, this notice feature allows multiple token services to cross reference ownership of a particular asset.

In some embodiments, the registry service collects various data from the various token services and ranks the different blockchains accordingly. The token services also register with the registry service to indicate the different types of assets they register, which can be updated from time to time. Multiple registry services may also be used, where different registry services specialize in tracking token services for specific types of assets.

In some embodiments, the registry service stores information about each token service (e.g., resource locations (URLs), token service owner/operator, security controls, etc.) and information about the asset classes stored by each token service (e.g., by asset classes, UPC, EPC, etc.). In an embodiment, all new asset classes that a token service would like to add to (register with) the registry service would be 'voted on' by the token services using a consensus algorithm (e.g., Proof of Stake and/or the like). Consensus is the process of reaching agreement among a group of participants (e.g., nodes in a blockchain network), some of which could be faulty or malicious. The voting token services may be all of the token services registered with the registry service, or only those related to the specific asset class. The asset classification may also utilize machine learning (ML) and/or artificial intelligence (AI) technology to create new groupings to improve the identification of categories requiring additional sub-categories as well as which categories need to be dropped to maintain the search speed. For example, clustering, deep learning, decision trees, support vector machines, genetic algorithms, and/or other ML/AI techniques may be used in such embodiments.

In some embodiments, the registry service and/or the individual token services may store wallet information. Wallet history may be used as a reputation factor that is built over time. For example, the more challenges or risky buys of assets a particular user (wallet) makes to try to prove ownership, the more they will have a negative record and lose credibility (similar to a credit score). This credibility may also be conveyed to the requesting user as a part of the ownership validation service. A similar type of reputation or credibility score may be used for individual token services, which may be based on how accurate they self-validate their registered assets. Other embodiments may be described and/or disclosed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, Inc. of San Francisco, California salesforce.com, Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, Inc. and can be implemented in the context of various other database systems such as cloud-based systems that are not part of a multi-tenant database system or which do not provide enterprise social networking services.

I. Example System Overview

FIG. 1A shows an example of an environment 10 in which on-demand services (e.g., cloud computing services and/or database services) can be used in accordance with various embodiments. The environment 10 includes user systems 12, a network 14, system 16 (also referred to herein as a "cloud-based system," "database system," "cloud computing service," or the like), and one or more customer platforms (CPs) 50. The cloud system 16 includes a processor system 17, an application platform 18, a network interface 20, tenant database (DB) 22 for storing tenant data 23 (see e.g., FIG. 1B), system DB 24 for storing system data 25 (see FIG. 1B), program code 26 for implementing various functions of the system 16, and process space 28 for executing DB system processes and tenant-specific processes, such as running applications as part of an application hosting service. In some other implementations, environment 10 may not have all of these components or systems, or may have other components or systems instead of, or in addition to, those listed above.

Figure 1B:
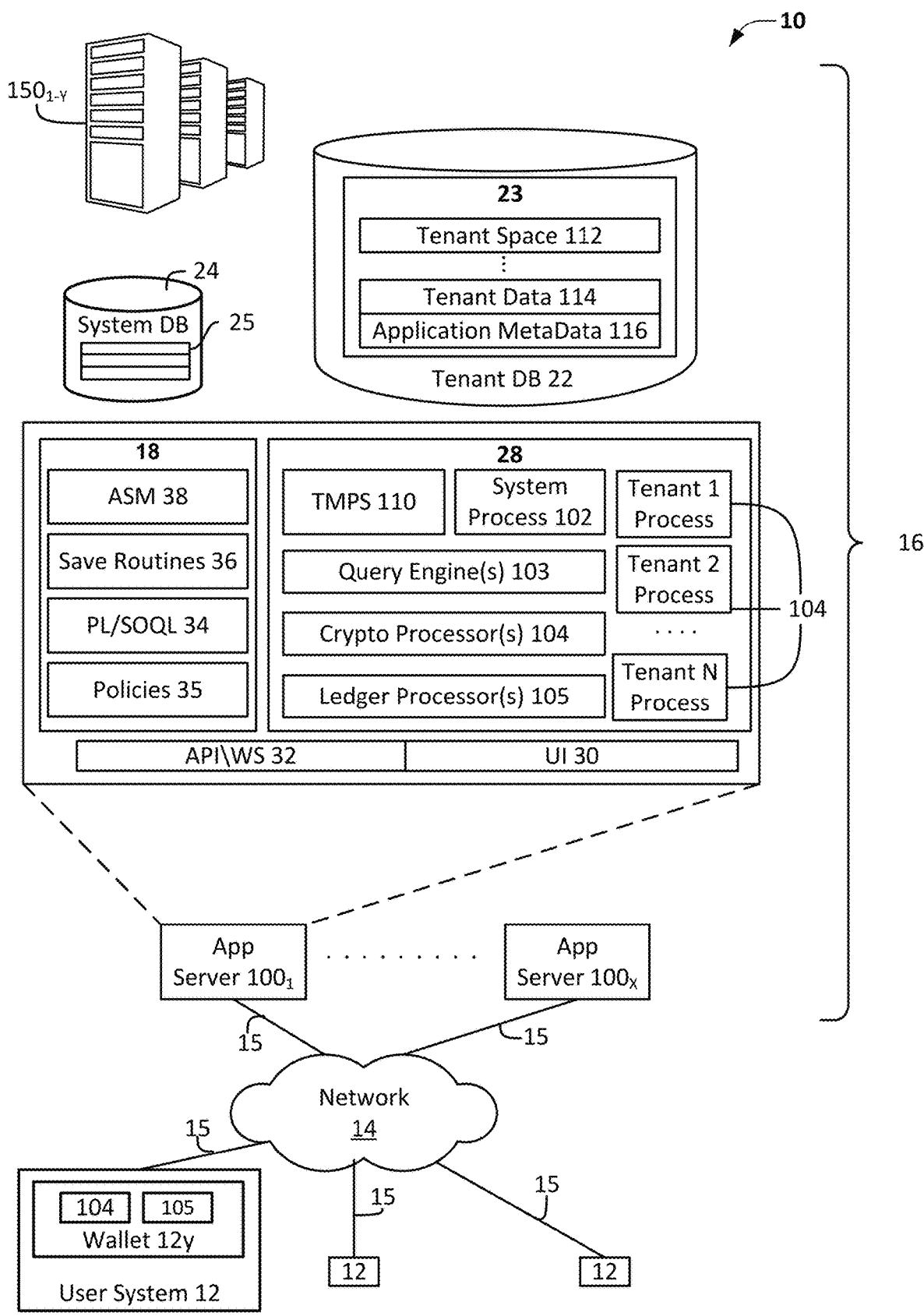
FIG. 1B shows an example implementation of elements of FIG. 1A and example interconnections between these elements according to various embodiments.

The system 16 may be a DB system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant DB system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand DB service exists. An on-demand DB service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand DB services can store information from one or more tenants into tables of a common DB image to form a multi-tenant DB system (MTS). The term "multi-tenant DB system" can refer to those systems in which various elements of hardware and software of a DB system may be shared by one or more customers or tenants. For example, a given application server may simultaneously process requests for a great number of customers, and a given DB table may store rows of data such as feed items for a potentially much greater number of customers. A DB image can include one or more DB objects. A relational DB management system (RDBMS) or the equivalent can execute storage and retrieval of information against the DB object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand DB service, users accessing the on-demand DB service via user systems 12, or third party application developers accessing the on-demand DB service via user systems 12.

In some embodiments, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a DB system related data, objects, and web page content. In some MTS implementations, data for multiple tenants may be stored in the same physical DB object in tenant DB 22. In some such implementations, tenant data is arranged in the storage medium(s) of tenant DB 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more DB objects and the execution of the applications in one or more virtual machines in the process space of the system 16. The applications of the application platform 18 may be developed with any suitable programming languages and/or development tools, such as those discussed herein. The applications may be built using a platform-specific and/or proprietary development tool and/or programming languages, such as those discussed herein.

In some embodiments, the system 16 implements a blockchain platform for building distributed ledger applications and networks. Blockchain is a technology that uses cryptography to create a secure linkages between records (referred to as "blocks"). Blockchain is a type of distributed database that can record transactions in a public or private peer-to-peer network. In the context of blockchain technologies, a "ledger" refers to a series of interconnected records or blocks; "distributed ledger" is another term for a blockchain. Blockchain technologies distribute a database of transactions (a ledger) to all participants in a network. The participants in a blockchain network are referred to as "peers" or "nodes". The ledger is shared, replicated, and synchronized among nodes in the network. In most implementations, a blockchain has no central administrator or centralized data storage system, however, in other implementations a centralized system may be used to validate blocks or perform other functions.

Most ledgers are used to track a specific type of information or transactions such as cryptocurrency, securities, asset tokens, smart contracts, and/or the like. Every record in a distributed ledger has transaction data, a timestamp, and a hash of the previous block in the ledger, making it an auditable, permanent record of all transactions. In some implementations, the hash of the previous block may act as a block identifier (ID), or a hash of the block itself (including the hash of the previous block) may act as a block ID. In some implementations, the blocks may be encrypted to enhance security. The nature of the cryptographic linkage makes the series of interconnected records more resistant to spontaneous changes to data in a record because publishing an update to an individual record entry also requires altering the cryptographic hash that was generated as the record was created, and any records added to the ledger after an altered record must be re-validated and re-added to the ledger (also with updated hashes). In a blockchain, a change to a record's value is typically published as a new ledger entry. When this single blockchain is connected to some kind of network that can handle communication between nodes and provide an agreed upon system for each node to verify changes to network data, then an individual blockchain can be replicated across different nodes in the network. This replication creates multiple blockchain ledgers, containing identical records that have been independently verified. In these ways, a blockchain is provides immutability for the transactions that are tracked.

The tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or DB, and, in some instances, a DB application (e.g., OODBMS or RDBMS) as is well known in the art. It should also be understood that "server system" and "server" are often used interchangeably herein. Similarly, the DB objects (DBOs) described herein can be implemented as part of a single DB, a distributed DB, a collection of distributed DBs, a DB with redundant online or offline backups or other redundancies, etc., and can include a distributed DB or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), DBOs, or some other like object(s)/document(s)). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), a Head-Up Display (HUD) device/system, a an Extended Reality (XR) device (e.g., Virtual Reality (VR), Augmented Reality (AR), and/or Mixed Reality (MR) device), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As shown by FIG. 1A, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application(s) 12y and/or other applications discussed herein) for carrying out the procedures, processes, methods, etc. of the embodiments discussed herein, as well as an operating system (OS) 12x and one or more DBs or DBOs (not shown).

The application(s) 12y (also referred to as "app 12y" or "apps 12y") is/are a software application designed to run on the user system 12 and is used to access data stored by the system 16. The apps 12y may be platform-specific, such as when the user system 12 is implemented in a mobile device, such as a smartphone, tablet computer, and the like. The apps 12y may be a native application, a web application, or a hybrid application (or variants thereof). One such app 12y may be the previously discussed HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and application(s) 12y available to it from the system 16 over the network 14. In other implementations, each user system 12 may operate a web or user app 12y designed to interact with applications of the application platform 18 allowing a user (e.g., a subscriber of on-demand services provided by the system 16) of the user system 12 to access, process and view information, pages, interfaces (e.g., UI 30 in FIG. 1B), and apps 12y available to it from the system 16 over the network 14. In some cases, an owner/operator of system 16 may have pre-built the web or user apps 12y for use by clients, customers, and/or agents of a tenant organization (org) to access a tenant space or enterprise social network of that tenant org. In some cases, developers associated with a tenant org (e.g., CP 50) may build custom application(s) for interacting with the tenant data. The user (or third party) application(s) may be native application(s) (e.g., executed and rendered in a container) or hybrid application(s) (e.g., web applications being executed/rendered in a container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the system 16, and/or a platform of a third party system/platform. The web, user, or third party application(s) 12y discussed herein may be a software, program code, logic modules, application packages, etc. that are built using one or more programming languages and/or development tools, such as those discussed herein. Furthermore, such applications may utilize a suitable querying language to query and store information in an associated tenant space, such as, for example, the various query languages discussed herein or the like. The apps 12y may be developed using any suitable programming language and/or development tools such as any of those discussed herein. In some implementations, the apps 12y may be developed using platform-specific development tools and/or programming languages such as those discussed herein.

In an example, the user systems 12 may implement web, user, or third party apps 12y to request and obtain data from system 16, and render graphical user interfaces (GUIs) in an application container or browser. These GUIs may correspond with GUI 12v and/or UI 30 shown and described with respect to FIG. 1B. In some implementations, the GUIs may include a data analytics GUI, such as Salesforce® Wave™ dashboard, Tableau® Desktop®, and the like, which may provide visual representations of data (also referred to as visual representations 12v or the like) residing in an enterprise cloud or in an on-demand services environment (e.g., a tenant space within system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of DB 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user id), password, personal identification number (PIN), digital certificates, etc.) to the system 16 so that the system 16 may authenticate the identity of a user of the user system 12.

In another example, the app 12y may be a blockchain app or service that enables a user of the user system 12 to interact with a blockchain or other decentralized ledger or database. The blockchain app 12y may store public and/or private keys, hash generators, encryption/decryption algorithms, and/or other like elements that can be used to generate blocks to be added to one or more blockchains. The blockchain app 12y may also include modules, logic, program code, etc., that allow the blockchain app 12y to validate other blocks generated by other user systems 12 before appending those blocks to the blockchain. In this example, the blockchain app 12y may be a digital wallet 12y, which is an app used to store a user's credentials (cryptographic private keys and/or public keys) that are associated with a state of a user's account in the blockchain. The wallet 12y allows the user to make transactions, where the public key of the public/private key pair allows other wallets to make payments to the wallet 12y (e.g., using the wallet's 12y network address, app/wallet identifier, or the like) and the private key of the public/private key pair allows the wallet 12y spend currency or cryptocurrency stored by the wallet 12y and/or in the blockchain.

In some embodiments, the user system 12 may include Trusted Compute resources that preserve data confidentiality, execution integrity and enforces data access policies. The Trusted Compute resources may be used to store cryptographic keys, digital certificates, credentials, and/or other sensitive information, and could be used to operate some aspects of the wallet 12y. The Trusted Compute resources can be implemented using software-based cryptographic security guarantees (e.g., Zero-Knowledge Proofs), virtualization using user-level or OS-level isolation (e.g., "containerization") or virtualization (e.g., using VMs), Trusted Multi-Party-Computation (MPC) resources, or using a Trusted Execution Environment (TEE). In either embodiment, the wallet 12y is capable of interfacing with the Trusted Compute resources and/or the one or more blockchain platforms using a suitable API 32 (see e.g., FIG. 1B). Where the Trusted Compute resources is/are implemented using secure enclaves, the wallet 12y can also interface directly with the enclave of a private transaction manager or other like entity, and/or interface with on-chain or off-chain enclaves. The private transaction manager may be a subsystem of a specific blockchain platform/system that implements privacy and permissioning, and/or validates blocks for inclusion in a blockchain.

A TEE is a hardware-based technology that executes only validated tasks, produces attested results, provides protection from malicious host software, and ensures confidentiality of shared encrypted data. The TEE operates as a protected area accessible to the processor system 12A to enable secure access to data and secure execution of instructions. In some implementations, the TEE may be a physical hardware device that is separate from other components of the user system 12 such as a secure-embedded controller, a dedicated SoC, or a tamper-resistant chipset or microcontroller with embedded processing devices and memory devices (sometimes referred to as a hardware security module (HSM) or a trusted platform module (TPM)). Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. In other implementations, the TEE may be realized using secure enclaves, which are isolated regions of code and/or data within the processor and/or memory/storage circuitry of the user system 12. Only code executed within a secure enclave may access data within the same secure enclave, and the secure enclave may only be accessible using the secure application (which may be implemented by an application processor or a tamper-resistant microcontroller). Various implementations of the TEE, and an accompanying secure area in the processor system 12A or the memory system 12B may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the user system 12 through the TEE and the processor system 12A.

Each user system 12 typically includes an operating system (OS) 12x to manage computer hardware and software resources, and provide common services for various apps 12y. The OS 12x includes one or more drivers and/or APIs that provide an interface to hardware devices thereby enabling the OS 12x and applications to access hardware functions. The OS 12x includes middleware that connects two or more separate applications or connects apps 12y with underlying hardware components beyond those available from the drivers/APIs of the OS 12x. The OS 12x may be a general purpose OS or a platform-specific OS specifically written for and tailored to the user system 12.

The input system 12C can include any suitable combination of input devices, such as touchscreen interfaces, touchpad interfaces, keyboards, mice, trackballs, scanners, cameras, a pen or stylus or the like, or interfaces to networks. The input devices of input system 12C may be used for interacting with a GUI provided by the browser/application container on a display of output system 12D (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. The output system 12D can include any suitable combination of output devices, such as one or more display devices, printers, or interfaces to networks. The output system 12D is used to display visual representations and/or GUIs 12v based on various user interactions. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and DB information accessible by a lower permission level user, but may not have access to certain applications, DB information, and data accessible by a user at a higher permission level. Thus, different users generally will have different capabilities with regard to accessing and modifying application and DB information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (e.g., processor system 12B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForcet, Tegrat, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

The CP 50 includes one or more physical and/or virtualized systems for providing content and/or functionality (i.e., services) to one or more clients (e.g., user system 12) over a network (e.g., network 14). The physical and/or virtualized systems include one or more logically or physically connected servers and/or data storage devices distributed locally or across one or more geographic locations. Generally, the CP 50 is configured to use IP/network resources to provide web pages, forms, applications, data, services, and/or media content to different user system 12. As examples, the CP 50 may provide search engine services; social networking and/or microblogging services; content (media) streaming services; e-commerce services; communication services such as Voice-over-Internet Protocol (VoIP) sessions, text messaging, group communication sessions, and the like; immersive gaming experiences; and/or other like services. The user systems 12 that utilize services provided by CP 50 may be referred to as "subscribers" of CP 50 or the like. Although FIG. 1A shows only a single CP 50, the CP 50 may represent multiple individual CPs 50, each of which may have their own subscribing user systems 12.

CP 50 (also referred to as a "service provider platform", "tenant", "tenant organization", or the like) may be a customer or tenant of the system 16 that develops applications that interact and/or integrate with the system 16 and utilize data from an associated tenant space in tenant DB 22; these applications may be referred to as "customer apps," "CP apps," or the like. The term "customer platform" or "CP" as used herein may refer to both the platform and/or applications themselves, as well as the owners, operators, and/or developers associated with the customer platform. The CP apps may obtain data from the associated tenant space 112 (see e.g., FIG. 1B) to render/display visual representations of relevant tenant data 114 (see e.g., FIG. 1B). In some cases, the CP apps utilize tenant data 114 for interacting with user systems 12 (e.g., subscribers of the CP 50) via the system 16. To do so, the CP apps include program code or script(s) that call APIs/WS 32 (see e.g., FIG. 1B) to access tenant data 114 and/or otherwise interact with the tenant space 112. As discussed in more detail infra, the CP apps include program code/scripts that call APIs/WS 32 (see e.g., FIG. 1B) to schedule and send messages to individual subscribers. In some embodiments, the CP 50 may be a blockchain service and/or tokenization service (e.g., tokenization services 206 of FIGS. 1B and 2-4), where one or more blockchains operate within an associated tenant space 112 to, for example, track and manage asset tokens. In this embodiment, the tenant data 114 may include various blocks of the one or more blockchains, asset tokens, and/or associated data.

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers $100_1$-$100_X$ (where X is a number). Each application server 100 (also referred to herein as an "app server", an "API server", an "HTTP application server," a "worker node", and/or the like) is configured to communicate with tenant DB 22 and the tenant data 23 therein, as well as system DB 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space (TMPS) 110. In various embodiments, the process space 28 includes one or more query processors 103, one or more cryptographic (crypto) processors 104, and one or more validation processors 105. In some implementations, the query processor(s) 103, the crypto processor(s) 104 and/or the validation processor(s) 105 may be stream processors, which are systems and/or applications that send or receive data streams and execute the applications or analytics logic in response to detecting events or triggers in/from the data streams. The stream processor(s) process data directly as it is produced or received and detect conditions from the data streams within a relatively small time period (e.g., measured in terms of milliseconds to minutes). The stream processor(s) may be implemented as software components (e.g., software engines, software agents, artificial intelligence (AI) agents, modules, objects, or other like logical units), as individual hardware elements, or a combination thereof. In an example software-based implementation, the stream processor(s) may be developed using a suitable programming language, development tools/environments, etc., which are executed by one or more processors of one or more computing systems (see e.g., processor system 17 of FIG. 1A). In this example, program code of the stream processor(s) may be executed by a single processor or by multiple processing devices. In an example hardware-based implementation, the stream processor(s) are implemented by respective hardware elements, such as GPUs (or floating point units within one or more GPUs), hardware accelerators (e.g., FPGAs, ASICs, DSPs, SoCs, digital signal controllers (DSCs), etc.) that are configured with appropriate logic blocks, bit stream(s), etc. to perform their respective functions, AI accelerating co-processor(s), tensor processing units (TPUs), and/or the like. In some embodiments, the stream processor(s) may be implemented using stream processor(s), which are systems and/or applications that send or receive data streams and execute the applications or analytics logic in response to detecting events or triggers from the data streams. The stream processor(s) process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AGO, StreamC™ from Stream Processors, Inc., and/or the like.

The crypto processor(s) 104 (also referred to "cryptographic engine(s)" or the like) cryptography and/or encryption services for individual tenants or CPs 50 by carrying out cryptographic operations. In some implementations, the crypto processor(s) 104 may include or execute one or more crypto-pipeline. A crypto-pipeline is a set of cryptographic operations (each of which are referred to as a "crypto stage" or "stage") used for encrypting/decrypting data and/or calculating hash codes/values. Each of the crypto stages may be connected in series, such that the output of one stage is a required input to a subsequent stage. The series of stages may be defined by any suitable crypto algorithms for encrypting/decrypting data, generating private/public keys, and/or for generating hash values (e.g., hash function(s)). The crypto algorithms may include, for example, asymmetric (public key) encryption algorithms (e.g., digital signature algorithms (DSA), key generation and exchange algorithms, key agreement algorithms, elliptic curve cryptographic (ECC) algorithms, Rivest-Shamir-Adleman (RSA) cryptography, etc.), symmetric (secret key) encryption (e.g., advanced encryption system (AES) algorithms, triple data encryption algorithms (3DES or TDES), twofish, threefish, etc.), cryptographic hash functions (e.g., secure hash algorithms (SHA) such as SHA-1, SHA-3 ("Keccak") SHA-256, etc.; a message-digest algorithm such as MD5, MD6, or the like; a keyed-hash message authentication code (HMAC) algorithm; BLAKE hash functions; Whirlpool; etc.).

As mentioned previously, the crypto processor(s) 104 may be implemented using stream processor(s). In other implementations, the crypto processor(s) 104 may be special purpose hardware elements specifically designed to secure hardware, software, and/or data using the crypto operations mentioned previously (e.g., a TEE/TPM/HSM, one or more GPUs, and/or the like). The hardware component(s) of the crypto processor(s) 104 may comprise one or more microprocessors, SoCs, SiPs, DSPs, DSCs, secure cryptoprocessor circuitry, hardware accelerators (e.g., FPGAs, ASICs, etc.), and/or any other suitable device(s). Additionally, in some implementations, the crypto processor(s) 104 may comprise a dedicated memory, which may be any suitable memory device discussed herein, or combination thereof. The dedicated memory may store program code (e.g. firmware, logic blocks, crypto-pipeline elements, etc.) to perform the crypto processing operations as discussed herein. This dedicated memory may also store the aforementioned encryption keys, digital certificates, and/or other like sensitive data in a hash table, a set of key-value pairs, and/or some other suitable data structure.

The validation processor(s) 105 comprises hardware and/or software elements responsible for validating transactions, generating and/or validating blocks, publishing transactions and/or blocks, consensus maintenance, and (global) blockchain state management, message handling and/or coordinating communication between clients and/or other nodes in the blockchain network. In some implementations, the validation processor 105 functionality may be separated from application-specific business logic. In some implementations, the validation processor(s) 105 may include or interact with one or more transaction processors. Transaction processor(s) validate transactions and update the state of a blockchain based on defined rules. Transactions are functions that change the state of the blockchain. In some implementations, each transaction is put into a batch, either alone or with other related transactions, then sent to validation processor(s) 105 of another node for processing. A batch is a group of one or more related transactions, and in some implementations, a batch is an atomic unit of state change for a particular blockchain. Transactions may be processed according to transaction logic (sometimes referred to as a "transaction family"), which is application-specific business logic (e.g., CP apps and/or the like) that defines a set of operations or transaction types that are allowed on a particular blockchain. This transaction logic implements a data model and transaction language for an application. The transaction language may be any of the programming languages discussed herein and/or some other blockchain specific language such as Bitcoin Script and/or a smart contract based language such as those discussed herein. In some implementations, the validation processor(s) 105 may include one or more consensus engines (not shown by FIG. 1B), which is/are separate processes or processors that provide consensus-specific functionality for the node via a suitable API 32.

In some implementations, the validation processor(s) 105 may implement or operate virtual machines (VMs), containers, or other suitable runtime environment(s) in which smart contracts may be executed. Smart contracts are computer programs that are executed by nodes in a blockchain network (e.g., user systems 12/wallets 12y, app servers 100, CPs 50, cloud nodes 150, etc.) to digitally facilitate, verify, and/or enforce the negotiation or performance of a contract, which may be made partially or fully self-executing and/or self-enforcing. Smart contracts can implement a contract between parties, where the execution is guaranteed and auditable. In various implementations, each node in a blockchain network may operate respective VMs, containers, etc., used to execute or run smart contract code. Smart contracts can be written in higher-level programming languages and compiled to smart contract-specific bytecode. The higher-level programming languages may be a smart contract specific language such as Ethereum® Virtual Machine (EVM) bytecode, Solidity™, Vyper (Python derived), Bamboo, Lisp Like Language (LLL), Simplicity provided by Blockstream™, Rholang, Michelson, Counterfactual, Plasma, Plutus, Sophia, and/or the like, or may be any of the other programming languages discussed herein, or combination(s) thereof.

According to various embodiments, each user system 12, app server 100, CP 50 (not shown by FIG. 1B), and/or cloud nodes $150_1$-$100_Y$ may operate as nodes in a distributed ledger or blockchain network. As such, each node in a blockchain network, including the digital wallet(s) 12y implemented/operated by the user systems 12, may also include or otherwise implement the same or similar crypto processor(s) 104 and/or validation processor(s) 105 discussed herein with respect to the app servers 100.

The application platform 18 includes an application setup mechanism (ASM) 38 that supports application developers' ("app developers") creation and management of applications. Such applications and others can be saved as metadata into tenant DB 22 by save routines (SRs) 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In some implementations, the application platform 18 also includes policies 35. The policies 35 comprise documents and/or data structures that define a set of rules that govern the behavior of the various subsystems of the app server 100. For example, one or more of the policies 35 may dictate how to handle network traffic for specific network addresses (or address ranges), protocols, services, applications, content types, etc., based on an organization's information security (infosec) policies, regulatory and/or auditing policies, access control lists (ACLs), and the like. Additionally, the policies 35 can specify (within various levels of granularity) particular users, and user groups, that are authorized to access particular resources or types of resources, based on the org's hierarchical structure, and security and regulatory requirements. The documents or data structures of the policies 35 may include a "description," which is a collection of software modules, program code, logic blocks, parameters, rules, conditions, etc., that may be used by the app server 100 to control the operation of the app server 100 and/or access to various services. Any suitable programming languages, markup languages, schema languages, etc., may be used to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., system 16) in a web browser or application container).

As mentioned previously, CPs 50 may be customers or tenants of the system 16 that develop CP apps that interact and/or integrate with the system 16 and utilize data from an associated tenant space in tenant DB 22. These CP apps may operate on or in the application platform 18, and may be developed using the aforementioned dev-environment. For example, CP apps may include or provide commerce apps/services (e.g., storefront and/or shopping cart apps, point-of-sale (PoS) apps/services, Warehouse Management System (WMS) and/or Enterprise Resource Planning (ERP) apps/services, etc.), digital marketing and engagement apps/services, advertisement network services data analytics apps/services, blockchain apps/services, and/or the like. The blockchain apps/services may include, for example, cryptocurrencies, smart contracts, asset token management services, and asset token registry services (see e.g., FIGS. 2-4 infra), and/or the like trusted networks. In some embodiments, the application platform 18 may provide various point-and-click tools that allow developers to quickly create blockchain networks. This simplifies blockchain app development by separating the blockchain platform from the app domain. In this way, app developers can specify the rules/logic appropriate for their specific apps and services without needing to know the underlying design and implementation details of the system 16.

In some implementations, the information that will be published to a ledger is represented as external objects. External objects are custom database objects that map to CP 50 data that is stored outside of the tenant space 112. These external object representations allow relationships between ledger records to be created, and give users the ability to work with ledger data using the application platform 18 as if the ledger recorder were tenant database objects in the tenant DB 22. In these implementations, the external objects are blockchain entities, and the blockchain platform cryptographically secures each transaction in the ledger (e.g., using crypto processor(s) 104), and handles the publication of updates securely and sequentially to the ledger (e.g., using validation processor(s) 105). As a record's data changes, the blockchain platform publishes new ledger entries for those changes, creating an auditable, independently verifiable history of the transactions. These changes are visible to (and verified by) each node in the blockchain network, and reflected in each node's local copy of the ledger.

To integrate with the system 16, the CP apps include program code or script(s) that call the APIs/WS 32 to create and activate orders. The CP apps may also include program code/scripts that call APIs/WS 32 to adjust the orders as discussed herein. The CP apps may also call the APIs/WS 32 to return aggregate statistics about various orders. In some embodiments, the CP apps 50 may be the client app 12*y* discussed previously, or a web app that is rendered and/or executed by the client app 12*y* (e.g., where the CP apps 50 are web apps and the client app 12*y* is a browser or other HTTP client that renders the web apps, executes client-side scripts, and/or the like). In other embodiments, the CP apps 50 may be server-side (e.g., CP 50 side) applications, that interact with the user-facing client app 12*y*.

The system 16 of FIG. 1B also includes a user interface (UI) 30 and one or more APIs 32 (also referred to as a "web service") to system 16 resident processes, which allow users or developers at user systems 12 to access the resident processes. The API(s) 32 is/are interface(s) for software components to communicate with each other. In some implementations, the API(s) 32 are source code specification(s) or a collection of libraries, routines, methods, data structures, fields, objects, classes, variables, remote calls, and the like that defines how a software element may access or interact with the underlying platform capabilities and features of the CP 50. Developers and programmers can use the API(s) 32 by importing the relevant classes and writing statements that instantiate the classes and call their methods, fields, etc. The application (app) code, app/service templates, and/or policies 35 developed by customer platforms may be pushed or otherwise sent to the system 16 using one or more APIs 32. In these implementations, the app code, app/service templates, and/or policies 35 may be developed using a development (dev) environment, programming language(s), and/or dev-tools provided by the system 16.

The API(s) 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, a JSON-Remote Procedure Call (RPC) API (e.g., Ethereum JSON-RPC API implemented by a public or enterprise Ethereum® blockchain platform), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API(s) 32 may include one or more public APIs and one or more private APIs. The public APIs are APIs that includes one or more publically exposed endpoints that allows user systems 12 to access tenant data. These endpoints specify where resources are located and/or how particular web services can be accessed. The app(s) 12*y* (see e.g., FIG. 1A) may be used to generate and transmit a message (e.g., an HTTP message) with a user-issued query and a suitable URI/URL to access of an endpoint of the system 16. In embodiments, one or more of the APIs 32 may be an asynchronous ("async") query API, where the user-issued query includes an API call or other like instruction indicating that a user-issued query should be treated as an aysnc query (referred to as an "async query verb"). The async query verbs to invoke the async query API 32 may be defined and/or coded using PL/SOQL 34 or some other suitable programming or query language. When an async query invokes the async query API, an async query engine (e.g., a query engine 103) or async query scheduler may generate a corresponding async query job. The term "job" as used herein refers to a unit of work or execution that performs work that comprises one or more tasks. Individual jobs may have a corresponding job entity comprising a record or DB object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine(s) 103, crypto processor(s) 104, and validation processor(s) 105 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 is communicably coupled with tenant DB 22 and system DB 24, for example, having access to tenant data 23 and system data 25, respectively, via a different network connection 15. For example, one application server 100$_1$ can be coupled via the network 14 (e.g., the Internet), another application server 100$_N$ can be coupled via a direct network link 15, and another application server 100$_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various DB functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the app servers 100 (see e.g., load balancer 228 of FIGS. 2A-2B discussed infra). Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be an organization (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant DB 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant DB 22 or system DB 24. The system 16 (e.g., an application server 100 in the system 16) can automatically generate one or more native queries (e.g., SQL statements or SQL queries or the like) designed to access the desired information from a suitable DB. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, DB manager, compiler, execution engine, and/or other like components. In some implementations, each of the illustrated DBs may generate query plans to access the requested data from that DB, for example, the system DB 24 can generate query plans to access the requested data from the system DB 24. The term "query plan" generally refers to one or more operations used to access information in a DB system. Additionally, the query engine(s) 103 may control or enforce the order in which queries and/or transactions are processed.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each DB can generally be viewed as a collection of objects, such as a set of logical tables, containing data fitted into predefined or customizable categories. As used herein, a "database object", "data object", or the like may refer to any representation of information in a DB that is in the form of an object or tuple, and may include variables, data structures, functions, methods, classes, DB records, DB fields, DB entities, associations between data and DB entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM DB can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM DB applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant DB system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Each application server 100 is also communicatively coupled with a backend cloud system including one or more cloud compute nodes $150_{1-Y}$ (where Y is a number; and collectively referred to as "cloud nodes 150," "cloud system 150," "cloud node 150", or the like), which may also interact with the DBs 22 and 24. The cloud system 150 provides various cloud computing services to CP 50 and/or user systems 12 such as providing IaaS, PaaS, etc., for CPs 50 to operate their distributed applications and services. In various embodiments, the cloud computing services may include the blockchain services discussed herein. For example, one or more CPs 50 may provide tokenization services (see e.g., token services 206 of FIG. 2) using the infrastructure and/or platforms provided by the cloud system 150. In another example, the cloud system 150 may provide token registry services (see e.g., asset token registry service 210 of FIG. 2) according to the embodiments discussed herein, such as those disused with respect to FIGS. 2-7.

The cloud compute nodes 150 may comprise one or more pools of servers, associated data storage devices, and/or other like computer devices dedicated to running/executing order management/processing and/or scheduling/queueing processes, procedures, etc. These servers may include the same or similar processor systems, memory systems, network interface, and other like components as the app servers 100 or other computer systems discussed herein. In some implementations, the servers may be or act as virtualization infrastructure for the cloud system 150. The virtualization infrastructure may comprise various hardware and software components and/or resources that are used to execute virtual or reconfigurable implementations of the cloud system 150, as well as individual components and/or subsystems. The cloud computing services provided by the cloud system 150 may be provided/implemented using virtualization and/or user-level isolation. Virtualization may refer to the abstraction of one or more isolated VMs, which are virtual versions of computer hardware platforms, storage devices, and/or network resource(s) that are operated by a virtual machine monitor (VMM) and/or hypervisor on shared computing resources. Each VM may operate one or more applications to perform various functions and/or provide various services to individual tenants and/or users. User-level isolation (also known as "containerization" or "operating system virtualization") may refer to the abstraction of multiple isolated tenant or user-space instances that may operate their own applications or services, run on a single host, and access a same OS kernel. Each tenant or user-space instance are virtualized and software-defined environments in which software applications can run in isolation of other software running on a physical host machine. The isolated user-space instances may be implemented using any suitable OS-level virtualization technology such as Docker® containers, Kubernetes® containers, Solaris® containers and/or zones, OpenVZ® virtual private servers, DragonFly BSD® virtual kernels and/or jails, chroot jails, sandboxes, and/or the like.

II. MDTPC Embodiments

Figure 2:
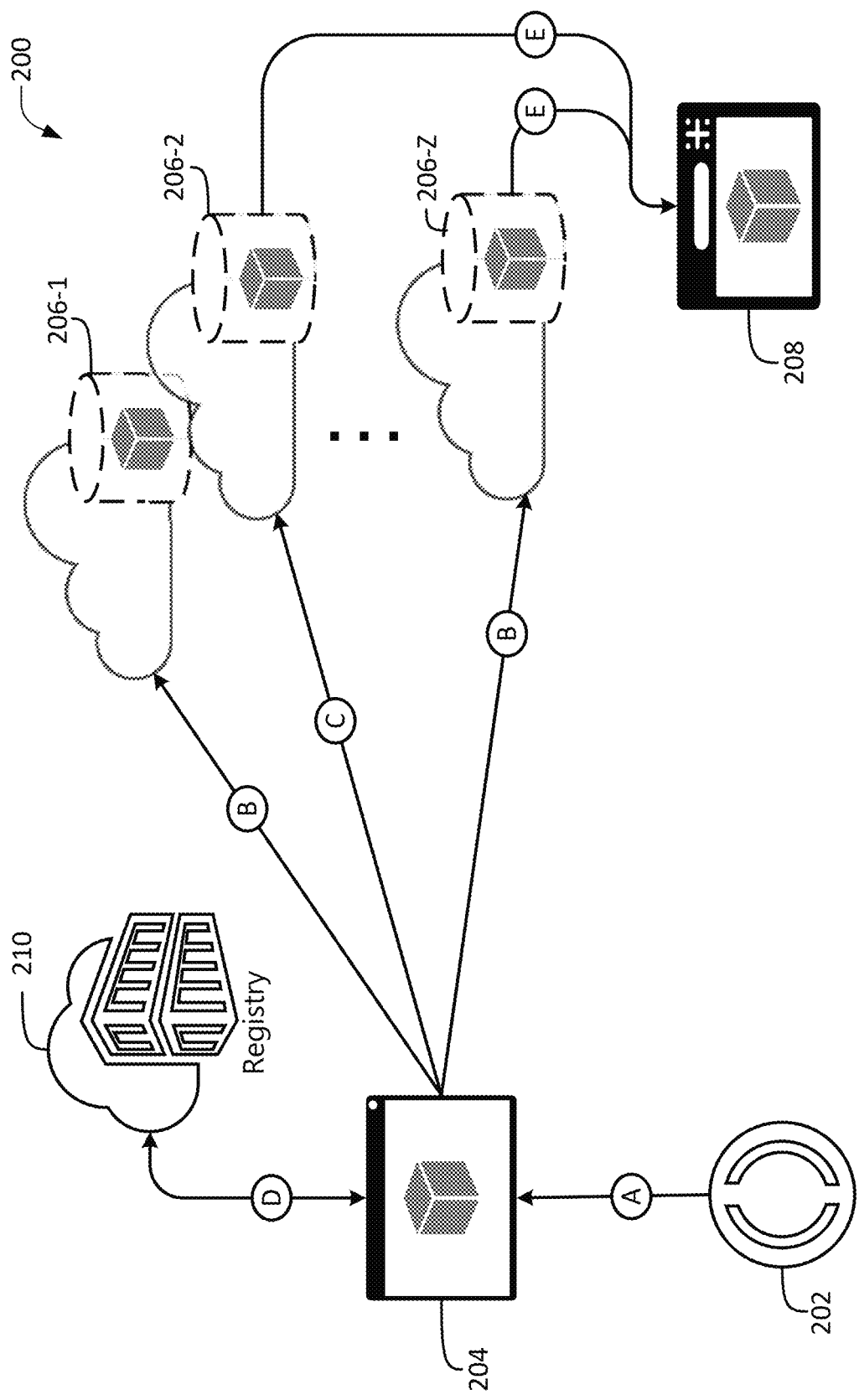
FIGS. 2-4 shows an example Multiple Decentralized Tokenization with Personal Control (MDTPC) architecture according to various embodiments.
Figure 3:
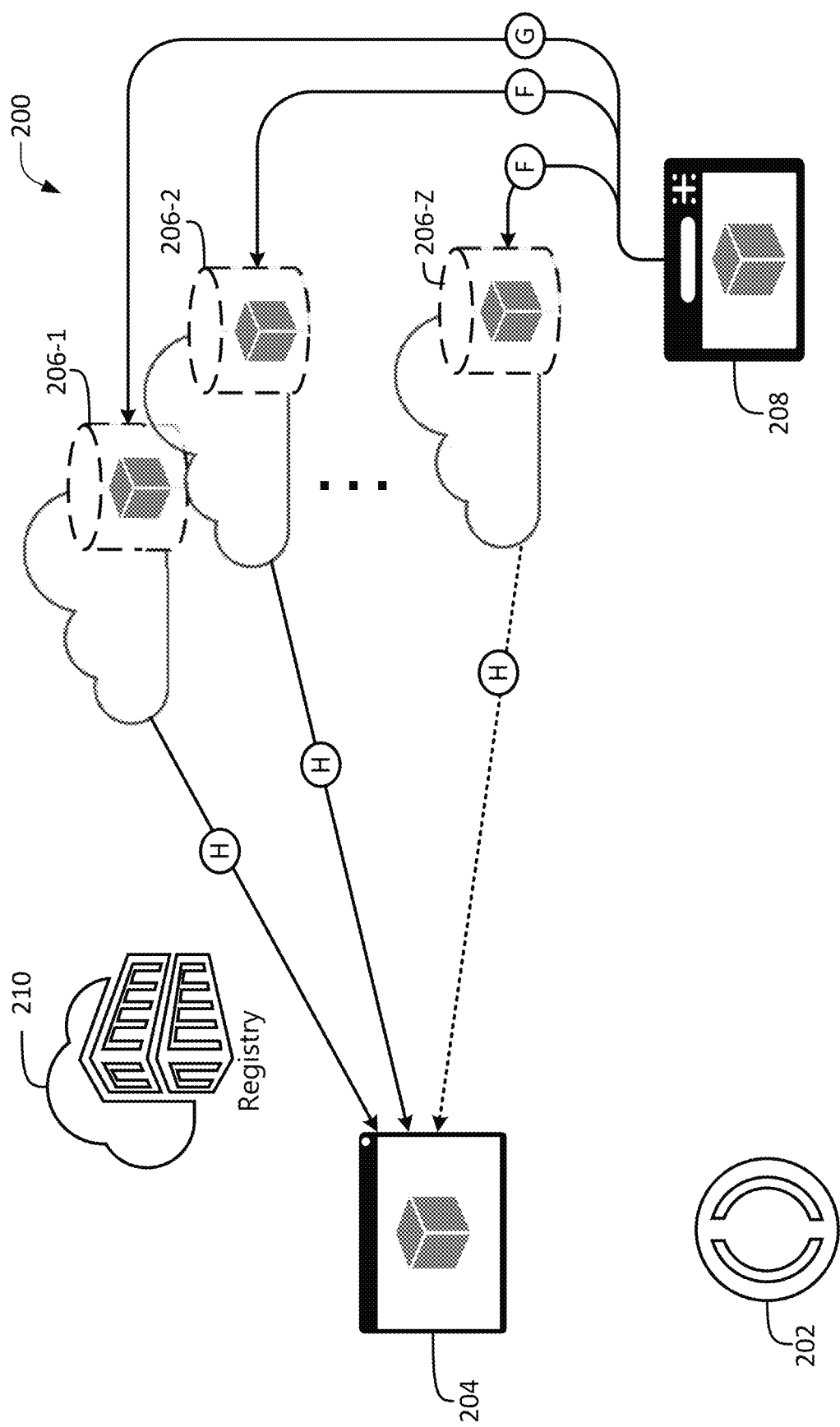
Figure 4:
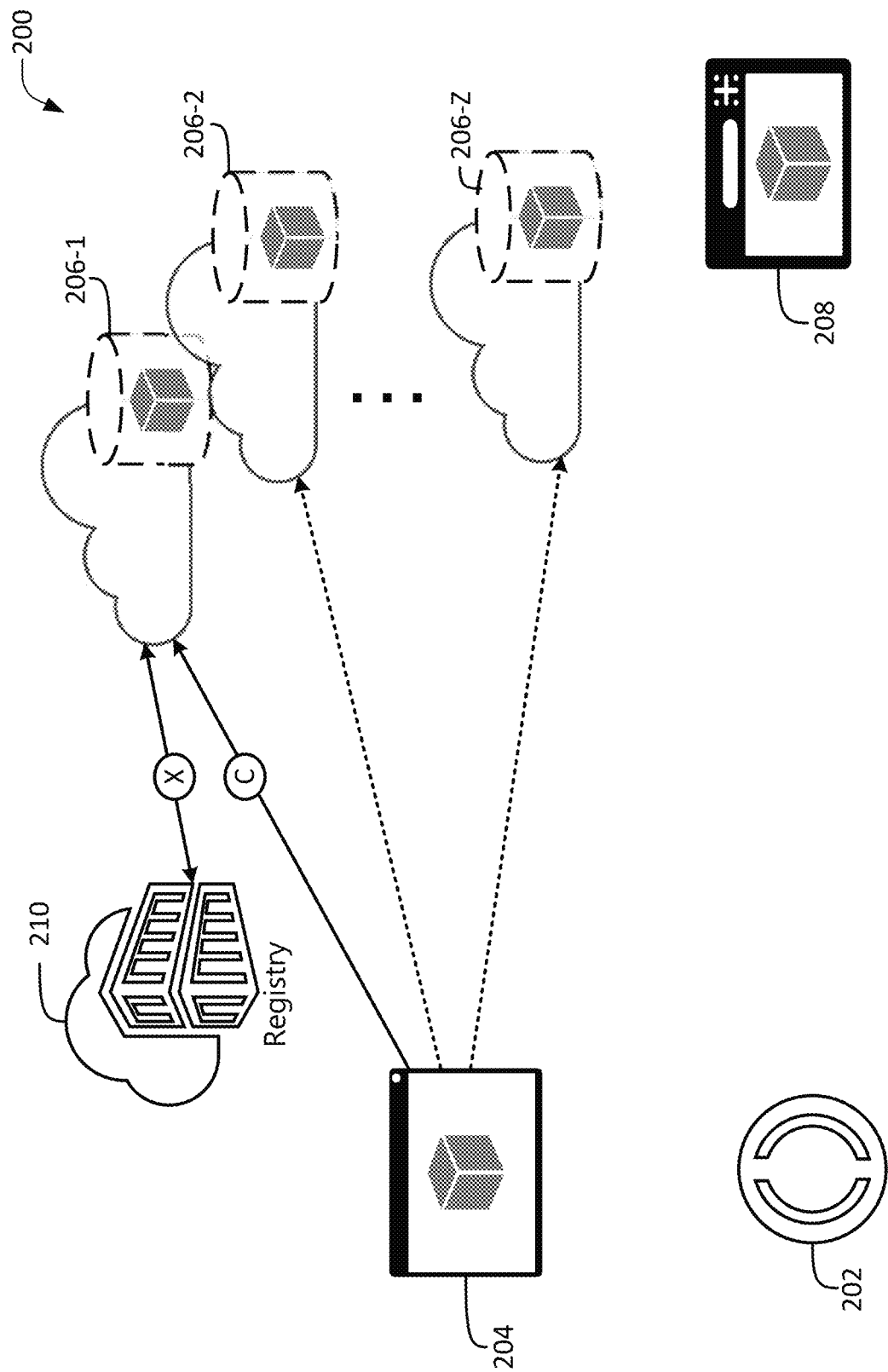

FIGS. 2-4 shows an example Multiple Decentralized Tokenization with Personal Control (MDTPC) architecture 200 according to various embodiments. As shown by FIGS. 2-4, the MDTPC architecture 200 includes an asset token 202, a digital wallet 204 (also referred to as a "requesting wallet 204"), an asset token registry service 210 (also referred to as "registry 210"), tokenization services 206-1 to 206-Z where Z is a number (collectively referred to as "token services 206" or token service 206"), and digital wallet 208 (also referred to as a "owner wallet 208").

The asset token 202 may represent any type of asset, such as total or partial ownership of a physical object (or a portion thereof), a company, an earnings streams, an entitlement to dividends or interest payments, a virtualized object or virtual property (e.g., in video games or simulated environments), rights to specific performance (e.g., the performance of a contractual duty), and/or the like. It should be noted that, although the term "asset" may be represented by an "asset token," for the purposes of the present disclosure these terms may be used interchangeably even though "asset" and "asset token" refer to different concepts. Typically, asset tokens 202 are used to prove ownership of an asset in a similar manner as a paper documentation of ownership (e.g., title, deed, certificate of authenticity, registration certificate, Document of Conformity (DoC), Conformité Européenne (CE) marking, etc.), authentication certificate, or other like documentation. The asset or rights to the asset is/are converted into the asset token 202 via a tokenization process.

As mentioned previously, blockchain-based tokenization services 206 only allows asset tracking on a single ledger (blockchain), and a single ledger is unlikely to be recognized across multiple regions, enterprises, or asset types/classes. And with the explosion in popularity of blockchain services, all claiming to have 'the one source' of truth, there are Multiple Decentralized Tokens all vying for leadership in the market for managing asset tokens. This makes it difficult for users to know to which token service they should register their asset tokens. Various embodiments utilize multiple blockchain token services 206 in conjunction with individual wallets 12*y* (e.g., wallets 204 and 208 in FIGS. 2-4) to share tokenization information for various assets, while the registry service 210 ensures visibility across multiple blockchains thereby increasing the likelihood of identifying the rightful (actual) owner of a particular asset.

Additionally, conventional tokenization services 206 do not provide owners of asset tokens control over their tokens as the owner would have over paper documentation. Currently, the process and personal control still of asset tokens utilize the token's smart contract control, where engagement with the owner is an afterthought. Smart contracts are computer programs that are executed by a token service 206 (or a VM operated by a token service 206), and can implement a contract between parties, where the execution is guaranteed and auditable to the level of security provided by the token service 206. This may result in an invasion of privacy over time because transactions on the ledger become more visible and build up an "on-chain" presence. In various embodiments, the owners of assets define the level of detail about the asset that is shared instead of relying on rules defined in a smart contract. Although conventional blockchains provide secure and cost effective decentralization of information, such blockchains still do not provide individuals with the ability manage their tokens in a same or similar manner as they would manage physical assets. The MDTPC embodiments herein allow asset owners to determine how and when asset evaluation is done or ignored. With existing technologies evaluation is based on smart contracts or sharing a token's public key. However, the visibility of public and private/permissioned blockchains still mean that users lose some degree of privacy and control on how and when to share asset information.

Referring now to FIG. 2, an asset token 202 is first identified by a unique identifier associated with the asset token 202. As examples, the asset identifier may be a vehicle identification number (VIN), a bar code, a quick response (QR) code, an Electronic Product Code (EPC), a product serial number (which may be extracted from a bar code, QR code, and/or EPC), an RFID tag (which could include an EPC), a Bluetooth/BLE® or iBeacon tag, legal instrument (e.g., real estate deed or the like) record index, Universal Property ID, or any other identifier. Where virtual assets are used, the asset identifier may be a credit score, a social security number (SSN), an International Securities Identification Number (ISIN), a Valor or Valorem Code, Wertpapierkennnummer (WKN), Asia Pacific Investment Register (APIR) code, Legal Entity Identifier (LEI), National Securities Identifying Number (NSIN), Market Identifier Code (MIC), Reuters Instrument Code (RIC), Stock Exchange Daily Official List (SEDOL) code, Classification of Financial Instruments (CFI) code, Financial Instrument Short Name (FISN), ticker symbol, Employer Identification Numbers (EIN), Tax Identification Number (TIN), cryptocurrency wallet ID, and/or combinations thereof.

Many assets are easy to counterfeit including reproducing the asset's associated identifiers, authentication and/or ownership documentation. In embodiments, a user of the requesting wallet 204 (e.g., a person who is interested in buying the asset token 202 or verifying the provenance of the asset token 202) posts a request to validate the asset token 202 to their wallet 204 (e.g., node A). This is different than conventional blockchain solutions or tokenization services where users are only able to post requests to transfer ownership of assets. As discussed in more detail infra, the validation request is evaluated before information is provided back to the requesting wallet 204.

In embodiments, posting the validation request to the wallet 204 allows the validation request to be cryptographically signed, which is also not done by conventional blockchain technologies. Conventional blockchain (e.g., Bitcoin type) transactions allow users to verify who owns an asset purely by reading the data on the blockchain. In embodiments, cryptographically signing the validation request causes the token services 206 to be queried (nodes B and/or C) about who owns the asset token 202. In some embodiments, the token services 206 digitally sign these queries. In these ways, posting the request in the wallet 204 initiates the request/querying securely but does not publicly expose the owners information.

At node C, the validation request is posted to the blockchain(s) operated by a token service 206 (e.g., token service 206-2). In some cases, the owner of the asset token 202 may indicate which token service 206 has the asset token 202 registered (e.g., token service 206-2), for example, by communicating offline, using a secure messaging application, providing a QR code to the wallet 204, and/or the like. In other cases, multiple token services 206 may be queried for ownership information (see e.g., nodes B and C). Examples of such cases may include scenarios where the owner of the asset token 202 cannot be identified or found, when the owner is untrustworthy (e.g., medication from a seller located in a foreign country), or the asset token 202 was stolen and is recovered by the appropriate authorities (e.g., vehicles, artwork, collectors' items, etc.). In these cases, at node D, the requesting wallet 204 queries the registry service 210 to discover one or more suitable token services 206 to which it should post the validation request. The requesting wallet 204 may provide various parameters to the registry service 210 indicating the characteristics of the asset token 202, and the registry service 210 may respond with a list of token services 206 that the asset token 202 is registered or potentially registered. Then, the wallet 204 may post the validation request to one or more personally identified token services 206 (e.g., token service 206-2 at node C in FIG. 2) and one or more registry-identified token services 206 (e.g., token services 206-1 and 206-Z at nodes B in FIG. 2).

In some embodiments, each token service 206 could send an inquiry message to the requesting wallet 204 to request additional information and/or to provide information to the requesting wallet 204. For example, the inquiry message may be used to inform the user of requesting wallet 204 about terms of service, disclaimers, privacy statements, a fee structure for providing the verification services, and/or the like information about using the token service 206. Such fee structure to could include, for example, free service; fees charged only if the owner is discovered, verified, and both parties share data; fees charged if the owner is discovered regardless of whether the owner shares data; fees charged for performing lookup procedures; fees charged to identify where else the asset may be registered (especially useful if there is a likely scam); fees for performing a deep search wherein the token services 206 interact with each other to search other blockchains (e.g., via smart contracts or the like); fees charged to the owner when the owner has subscribed to the token service 206 or is willing to pay a fee for the token management services (this would be specifically valuable for managing "Title Protection" when an owner is looking to aggressively defend their legitimate ownership (such as collectables)); fees for utilizing the registry service 210 to look up or host the match of asset token 202 descriptions/identifiers to token services 206. Based on the fee structure options provided by the token services 206, the requesting wallet 206 can confirm the commitment to pay and request the validation service. In some implementations, the validation is managed by a blockchain smart contract or some other suitable mechanism. Furthermore, in the event that a particular token service 206 does not include the requested asset token 202, that token service 206 may send a response to the requesting wallet 204 indicating that the asset token 202 was not listed in any of the blockchains managed by the token service 206 using, for example, a suitable status code (e.g., HTTP response code) and/or the like.

In the example of FIGS. 2-4, the owner (represented by wallet 208) has registered the asset token with two of the token services 206 (e.g., token services 206-2 and 206-Z) and the owner wallet 208 receives a notification from the two token services 206 (e.g., nodes E in FIG. 2). In the example depicted by FIG. 2, the owner wallet 208 is depicted as an individual client application, however, in other embodiments, the owner wallet 206 could be operated by a regulatory agency system (e.g., a Department of Motor Vehicles (DMV) when the asset is a vehicle, a state/provincial licensing authority, or the like), a device or product manufacturer and/or service provider (e.g., mobile network operator when the asset is a smartphone or tablet computer device), a collectors registry, an insurance company, and/or the like. The user of the owning wallet 208 can evaluate the fee structures for providing the tokenization services, and determine if any information should be shared. In some embodiments, the notification to the owner wallet 208 could include a description of the asset, a name or other identifier of the requesting wallet 204, a name or identifier of the registry service 210, and/or any other type of information. Usually, the notification may include the content of the validation request, and in some embodiments (such as when the registry service 210 is queried by the requesting wallet 204), each notification may include a list of all token services 206 to which the validation request was posted and/or each token service 206 where a search has been performed (e.g., the notification from token service 206-2 may list each of token services 206-1, 206-2, and 206-Z, and the notification from token service 206-Z may list each of token services 206-1, 206-2, and 206-Z).

Referring now to FIG. 3, at nodes F and G, the wallet 208 sends a response to respective token services 206 in response to receipt of the notifications from the token services 206. If the owner does not want to share any information, which may be the case when the owner does not expect someone to be requesting proof of ownership, the owner wallet 208 can reject the request by sending a response message indicating as much. This message may indicate that the owner is in control and/or possession of the asset and declines to provide any additional information. In this example, the owner wallet 208 may send this message only to the two token services 206 at which the token is registered (e.g., token services 206-2 and 206-Z). If the owner would like to provide information about the asset, the response to the notifications confirming ownership may include a wallet ID of wallet 208, and any selected details about the asset (e.g., nodes F and G), which are then provided back to the requesting wallet 204 (e.g., nodes H). This response would allow the requesting wallet 204 to have concurrence between the physical asset and (e.g., all known) token services 206.

In the example of FIG. 3, token service 206-1 request (e.g., node G) did not currently register the asset token 202, and may be a token service 206 the owner was not aware of prior to receipt of notifications which may have been indicated by the validation request. Now that the owner is aware of this new token service 206-1, the owner wallet 208 can register the asset token 202 with the token service 206-1 by, for example, confirming with token service 206-1 (e.g., at node G) that the asset token 202 is of the right type to be registered with the token service 206-1 and paying any fees associated with the registering the asset token 202 with the token service 206-1 (if necessary).

Once the token services 206 have confirmation from wallet 208 regarding the particular information and/or the level of detail to provide to the requesting wallet 204 about the owner and/or asset token, each token service 206 sends the information/data concerning the asset token and/or owner back to the requesting wallet 204 (e.g., nodes H). The time period for providing the data to the requesting wallet 204 may be based on the logic in the smart contracts operated by each token service 206 and/or specified by the owner wallet 208. This provides personal control of when and how data is shared that is not possible using conventional smart contracts solutions. Furthermore, the owner wallet 208 may specify different amounts of data/information to be shared by individual token services 206. For example, the owner wallet 208 may specify that the token service 206-2 should only provide basic information at any time, specify that token service 206-Z should provide more details relatively soon after receipt of the response, and specify that token service 206-1 may provide data after a few hours or days since it was not originally part of the chain that the owning wallet 208 was registered.

In addition to the aforementioned embodiments, the token services 206 and/or owner wallet 208 may detect counterfeits or other like illegal activities. In such embodiments, if another entity had registered a same or similar asset token as the asset token 202 (e.g., a counterfeit token) on one of the token services 206, a challenge is initiated, which utilizes the registry service 210, immutable features of the blockchains, and/or the multiple blockchains of the token services 206 to confirm if there is a way to verify the authenticity of the counterfeit token. Sometimes a counterfeit token or maliciously transferred token can create a fork in a blockchain (or a split network/chain). A blockchain fork is a situation that occurs when two or more blocks have the same block height, and/or typically occurs when a blockchain diverges into two potential paths forward. In some embodiments, the registry service 210 may determine or identify a token service 206 where a manufacturer token is registered and also where a matching transfer has been executed.

Resolving a blockchain fork (e.g. the correction of conflicting data) may involve a process of assigning a preference to one chain and setting the other chain as an "orphan" chain. Forks resolved in this manner are often referred to as accidental forks, which is when two or more miners (e.g., block validating nodes) find (or validate) a block at nearly the same time. In typical blockchain technologies such as Bitcoin, a fork is resolved when subsequent block(s) are added to each chain in the fork resulting in one of the chains becomes longer than the alternative(s), and the network abandons blocks that are not in the longest chain (where the abandoned blocks are referred to as "orphaned blocks").

In various embodiments, resolving a fork can be addresses by a suitable consensus algorithm (e.g., a proof-of-stake (PoS) algorithm or the like) or using a smart contract solution. In these embodiments, orphaning a chain is based on the longest "provenance". The term "provenance" refers to a description of what influenced a generation of a piece of information or data, and in the context of blockchain and/or tokenization technologies, "provenance" may refer to tracking and recording tokens as they flow through a blockchain network. In these embodiments, a consensus algorithm or smart contract evaluation will utilize the information from the MDTPC to address conflicting information across multiple chains to ensure there is alignment. For example, the ability of token service 206-1 with a fork/conflict to evaluate the provenance from other blockchains managed by token service 206-Z based on details from the conflicting wallets 12y that will allow the evaluation of the longest historical provenance with the most reputable sources to resolve the fork and orphan (e.g., remove) the least defendable token claim. This is different than conventional blockchain technologies that only analyze the longest branch of the technical chain and abandon blocks not included in the longest chain. In embodiments, information about the orphaned token can be shared with other token services 206 and the registry service 210 to track malicious wallet 12y interactions. Additionally, the wallets 12y will also be notified to allow them to challenge the blockchain consensus via traditional mechanisms (e.g., legal review, etc.).

In various embodiments, the token services 206 may register with the registry service 210 to aid in asset ownership discovery. For example, by posting the validation request to the token service 206-1, the token service 206-1 service is made aware that requesting wallet 204 believes token service 206-1 manages tokens for particular asset type(s) or class(es), such as the asset type or asset class of asset token 202. With reference to FIG. 4, the token service 206-1 may want to log a token service value to the registry service 210. The token service value provided to the registry service 210 and/or otherwise stored by the registry service 210 may be a suitable data structure that includes descriptors or data items describing or representing the classes, subclasses, kinds, types, categories, etc., managed by the token service 206; the validation procedures/processes (including consensus algorithms, if any) performed by the token service 206 to validate, verify, and/or authenticate asset owners and tokens; the countries, regions, governments, agencies, regulatory bodies, standards organizations, etc., that the token service 206 covers or supports, supported languages (human and/or programming/scripting languages), and/or other like token service 206 related capabilities and/or services. Additionally or alternatively, the registry service 210 (of which there may be many) collects various information/data about the token services 206 and stores the collected information in association with the registered token service values. The registry service 210 may then use the registered values and the collected information to sort, rank, or otherwise classify the various token services 206, and to fulfill the validation queries from requesting wallets 204. In one embodiment, the registry service 210 determines a reliability measurement based on the token service values and collected data, and ranks the token services 206 according to the reliability measurements. The reliability measurements of the token services 206 may be determined/generated a combination of factors such as the number of assets and/or asset tokens stored/managed by each token service 206 compared to other token services 206, how many ownership challenges have been executed, their registration processes, if the token service 206 uses protection mechanisms (e.g., anti-spoofing) and the type of protection mechanism(s) used, and the like. The inherent value of each token service's 206 blockchain is directly tied to how well each token service 206 validates an asset token link or chain of title. Additionally, this provides several ways to cross reference ownership utilizing multiple blockchains. Moreover, the number of requests for validation goes to the level of veracity the requester is looking to verify the ownership. Additionally or alternatively, the registry service 210 may use the ranks and/or reliability scores of the token services 206 to justify its own usefulness in comparison to other registry services 210, and/or my calculate its own reliability score for comparison with other registry services. This reliability score may be the same or similar as the reliability score of the token services 206 and/or may be based on the number and type of token services 206 registered with the registry service 210.

In these ways, the wallets 204 and 208 may use the reliability scores to determine the usefulness or suitability of particular token service(s) 206 over other token services 206 and/or a particular registry service 210 over other registry services 210 (not shown by FIGS. 2-4). This is because, over time some token services 206 and/or registry services 210, intentionally or inadvertently, may become specialized to a particular asset type or class due to token services 206 specializing in those asset types/classes registering with a particular registry service 210. For example, a registry service 210 could become specialized in managing token services 206 related to automotive assets, collectible assets (e.g., memorability), artwork assets, assets/products produced by a particular manufacturer, specific products, virtual property, assets in a specific country, region, jurisdiction, or the like.

In some implementations, a single registry service 210 could be used to manage the plurality of token services 206, similar to the Domain Name System (DNS) which is a common system/structure that manages the naming convention for web resources on the Internet. In these implementations, the individual token services 206 may act as individual domains, and individual distributed nodes or clusters of the registry service 210 may be designated as authoritative name nodes/servers or otherwise tasked with assigning domain names to the individual token services 206, mapping those names to web resources of the token services 206, and answering (responding to) queries for token services 206 in the manner described herein (e.g., responding to the posted request to validate the asset token 202 at node A in FIG. 2). In other implementations, the In one example use case, if the requesting wallet 204 is trying to verify the owner of a motorcycle (e.g., where asset token 202 is related to the title of the motorcycle), the requesting wallet 204 may use the registry service 210 to identify token services 206-1 and 206-Z, the user of the requesting wallet 204 may know (or believe) that token service 206-2 is also a suitable token service 206 for registering motorcycle-related asset tokens because this user registered their own asset token associated with a car title or because this user recently consumed (e.g., viewed) an advertisement for token service 206-2. The requesting wallet 204 may add token service 206-2 to the request for ownership verification along with the token services 206-1 and 206-Z identified by the registry service 210. After the token service 206-2 receives inquiries or requests for ownership validation related to motorcycle related assets, token service 206-2 can implement services/products for managing motorcycle-related asset tokens. At this point, token service 206-2 can register with the registry service 210 for motorcycle asset types and/or asset classes so that more users use token service 206-2 for motorcycle-related asset tokens and transactions.

In some embodiments, the registry service 202 may use an advertisement model, where the token service 206 may pay to be included in response to queries/requests based on keywords included in the queries/requests and/or other contextual or behavioral tracking mechanisms. Continuing with the aforementioned example, in addition to registering with the registry service 210 for motorcycle asset types and/or asset classes, the token service 206-2 can pay to be included in a response to a requesting wallet 204 or otherwise identified as a suitable token service 206 managing motorcycle-related asset tokens so that more users become aware of token service 206-2 for motorcycle-related asset tokens and transactions. In these embodiments, the registry service 210 may utilize any suitable advertising technology (AdTech) used to manage and run online advertising campaigns and/or determine particular sponsoring token services 206 to be included in a response to a particular request/query.

The data structure used to store the token service 206 values, reliability scores, and other data/information is a specific part of the registry service 210, although different registry services 210 offered by different service providers may operate their own respective data models. The data structure implementation uses a complex alignment to ensure the appropriate grouping of multiple blockchains across multiple token services 206. The registry service 210 data structure provides interoperability among the token services 206 and wallets 204, 208. In some implementations, the registry service 210 data structure is a many-to-many directory with associated business rules. In these implementations, the many-to-many directory comprises token service 206 blockchain details (e.g., directory) and the asset class(es) of each token service 206.

The token service 206 blockchain details (e.g., directory) includes, for example, access (resource) location such as a URI, URL, IP address, domain name, and/or other like identifiers/addresses; a service provider or platform identifier such as a name, pointer, registration number, or other unique identifier; and security controls which may include, for example, access tokens, encryption requirements, digital certificates, public key infrastructure (PKI), and/or the like. The asset class(es) (e.g., a catalog of each token service 206) comprises the asset classes and/or asset categories of each type and/or kind of asset tokens managed by the token service with appropriate sub-classifications, if necessary. The term "class" in "asset class" refers to a collection of objects that can be unambiguously defined by a property that all its members share. The term "asset kind" or "kind of asset" refers to a final or intended usage of a particular asset, for example, a smartphone, smartwatch, painting, baseball card, vehicle, sensor, pharmaceutical/medicine, and/or the like. The term "asset type" or "type of asset" refers to a specific series of asset of a given asset kind and/or with a given configuration (e.g., a specific smartphone such as Apple® iPhone® 7, Samsung® S6, etc.). Sometimes an asset type may be referred to as a "make" and/or "model." The term "asset category" refers to a combination of an asset type with one or more asset classes (e.g., a specific smartphone type combined with a "power class", a "fraud protection class", or the like). The asset classes, kinds, types, and categories may be based on the Universal Product Code (UPC), International Article Number (also known as the European Article Number (EAN)), EPC, Global Trade Item Number (GTIN) and/or other GS1® codes/identifiers, North American Product Classification System (NAPCS) codes, manufacturer issued serial numbers, and/or other like identifiers such as any of the other identifiers discussed herein. Additionally, the asset class (catalog) data structure may utilize a hierarchal model, such as: assetClass/assetKind/assetType/assetModel/assetCategory/assetCharacteristic1, . . . , assetCharacteristicN (where N is a number). An example for a vehicle may include: Vehicle>Car>Lamborghini>Roadster>1995>Red. Furthermore, the asset class (catalog) data structure may also include a description of the asset classes, kinds, types, makes, models, categories, and/or characteristics.

In one embodiment, inbound requests to create a new asset class, sub-class, etc., is validated by the number of assets already registered for a particular token service 206 and/or under the token service's 206 management. This helps reduce the number of unique sub-classes that would have few tokenized assets, which may help conserve storage/memory resources. Additionally or alternatively, all new asset classes may be 'voted on' by the registered token services 206 using a suitable consensus algorithm (e.g., Proof of Stake) based on the entire registry service 210 and/or the specific class. As examples, the consensus algorithms used to vote on the addition of new asset classes may include PoS, proof of ownership, proof-of-work (PoW), proof-of-elapsed time (PoET), proof-of-burn, proof-of-activity, proof-of-capacity, a practical byzantine fault tolerance (PBFT) algorithm, a Ripple protocol based algorithm, a Raft consensus algorithm, and/or some other consensus algorithm. In some embodiments, a variety of consensus algorithms may be used, and in some implementations individual blockchain network nodes select or vote on a desired consensus algorithm to use (e.g., a "pluggable consensus" or "dynamic consensus").

In alternative embodiments, a machine learning and/or artificial intelligence algorithm may be used to create asset classifications and/or other new groupings to improve the identification of classes, kinds, types, etc., requiring additional sub-categorization as well as classes, kinds, types, etc., to be dropped, which should improve storage and computational conservation and/or maintain/improve search speed. In any of the aforementioned embodiments, the token services 206 are able to track how other token services 206 are registered for similar asset tokens when queries/requests come in so that the token services 206 can improve their own metadata, listings, entries etc., with the registry service 210.

With respect to challenging ownership, MDTPC is not a guarantee of ownership as blockchain smart contracts are never a full legal replacement for existing contracts. MDTPC provides a new technical solution to improve the ability to validate ownership challenges. This is done by showing the registry service 210 was used before adding new entries, and applying global standards being followed for asset classification. In various embodiments, wallet 204, 208 history is also now part of the reputation that asset owners build, where the more they buy, own, and can show they are an honest actor, the more reputation is built. The more challenges or risky buys of assets they make to try to prove ownership, the more they will have a negative record and lose credibility. This is also true of which token services 206 have the best scores of self-validating asset tokens registered.

Example use cases for the various embodiments discussed herein may include tracking airline luggage across multiple locations/flights; replacing Tile with a decentralized Bluetooth signing; tracking animals and/or pedigrees (e.g., race horses, dog breeds); tracking vehicle ownership; tracking real estate deed/title recordation; star registries; pharmaceutical sales; ticket sales (e.g., for musical concerts, plays, etc.); stocks or commodities trading; tracking ownership of luxury items, artwork, collectors' items, and the like; and professional evaluation (e.g., authenticity of artwork, collectables, etc.).

Figure 5:
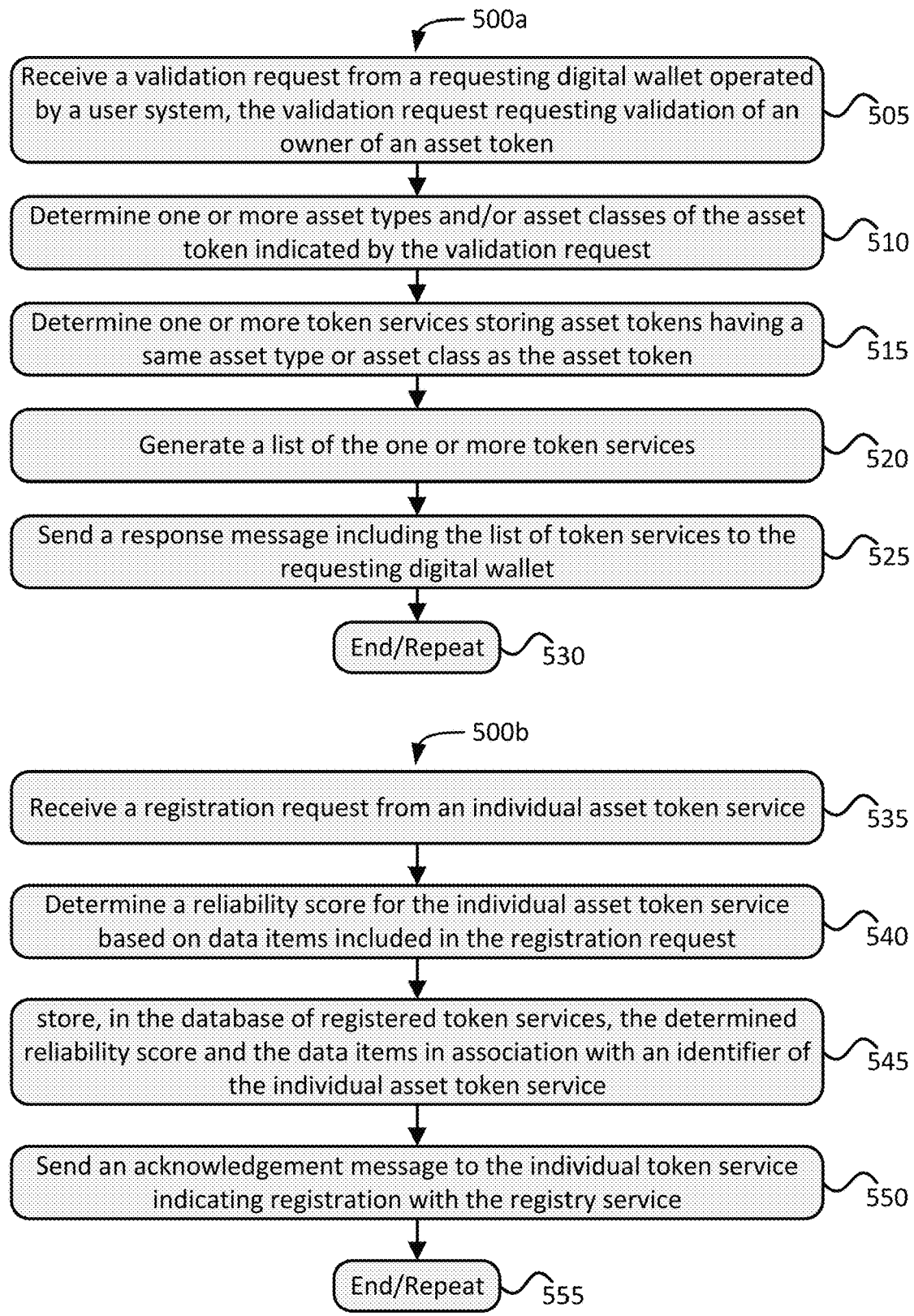
FIGS. 5-7 illustrate various processes for practicing aspects of the embodiments discussed herein.
Figure 6:
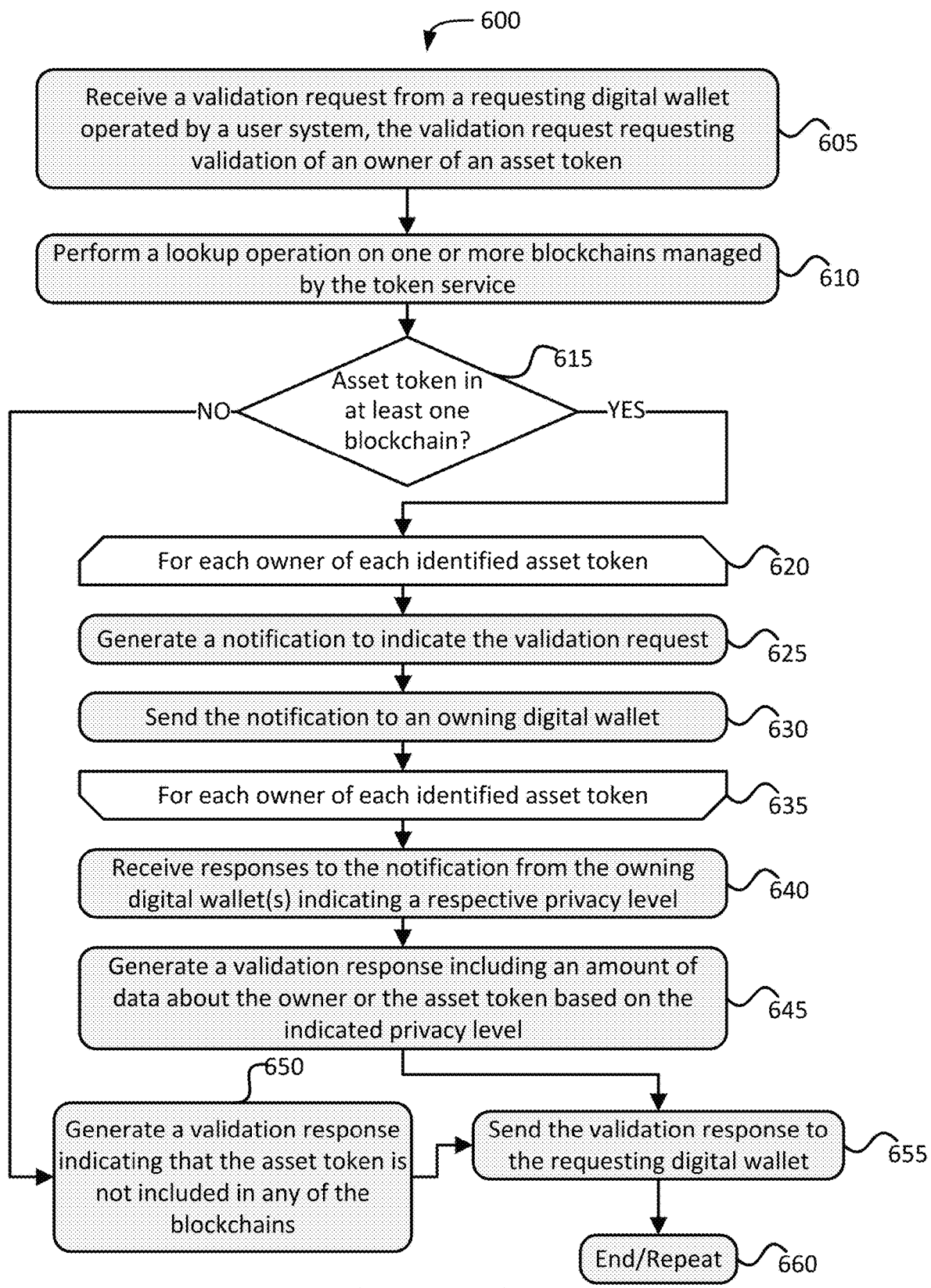
Figure 7:
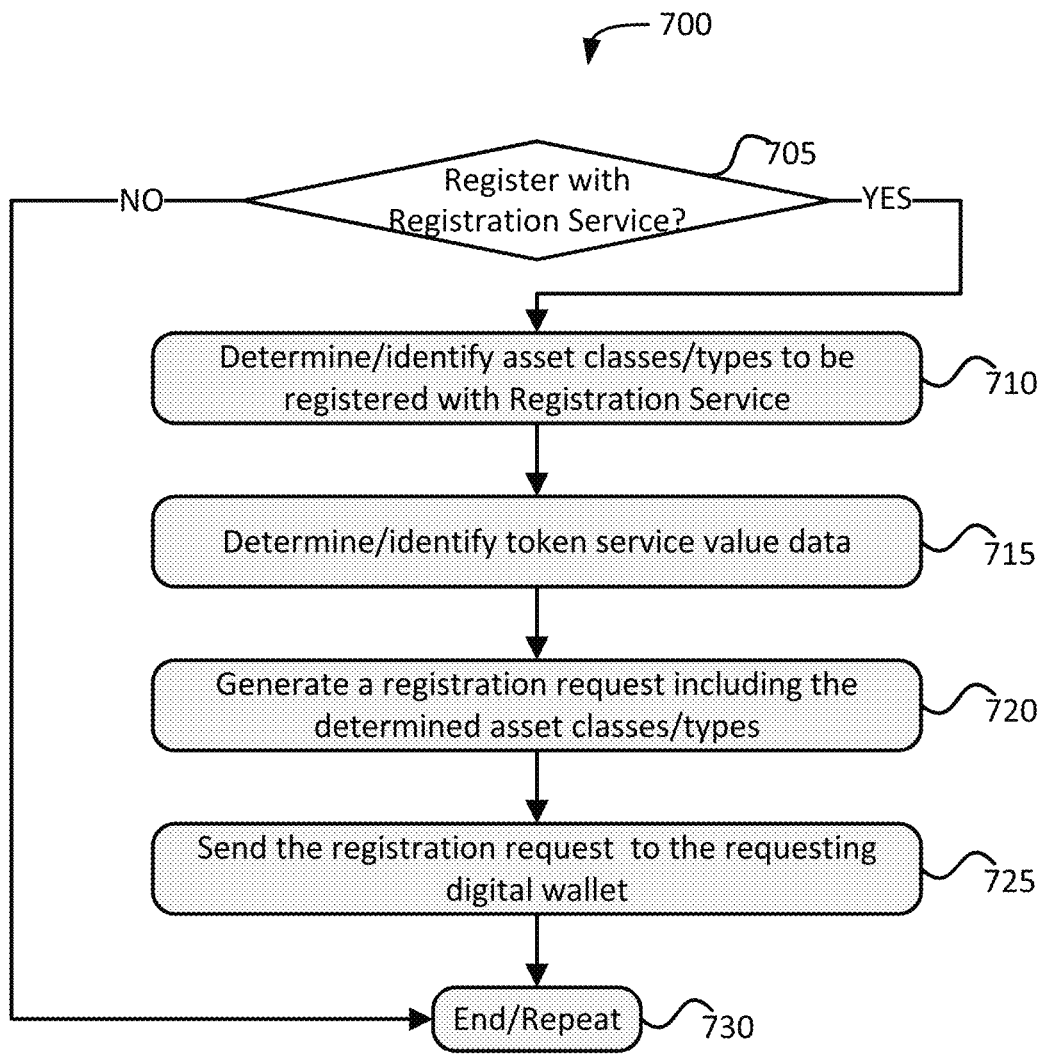

FIGS. 5-7 illustrate various processes for practicing aspects of the embodiments discussed herein. For illustrative purposes, the operations of the processes depicted by FIGS. 5-7 are described as being performed by elements/components shown and described with regard to FIGS. 1A-4. However, other computing devices may operate the processes depicted by FIGS. 5-7 in a multitude of implementations, arrangements, and/or environments. In embodiments, the computer system(s) includes program code stored in a memory system, which when executed by a processor system, is configurable to the computer system(s) to perform the various operations of processes m100 and m200. While particular examples and orders of operations are illustrated in Figures m1 and m2, in various embodiments, these operations may be re-ordered, separated into additional operations, combined, or omitted altogether.

Referring now to FIG. 5, which shows an lookup process 500*a* and a registration process 500*b* that may be performed by registry 210. Process 500*a* begins at operation 505 where the registry 210 receives a validation request from a digital wallet implemented by a user system 12 (e.g., wallet 204). The validation request is for requesting validation of an owner of an asset token 202 (e.g., owning wallet 208). At operation 510, the registry 210 determines one or more asset types, asset classes, etc., of the asset token 202 indicated by the validation request. At operation 515, the registry 210 determines one or more token services 206 that manage asset tokens having a same or similar asset types, asset classes, etc., as the asset token indicated by the validation request. In some embodiments, operation 515 may involve identifying, from a database of registered token services, a set of token services 206 managing asset tokens having a same or similar asset type, asset class, etc., as the asset token 202. In some embodiments, each registered token service 206 in the database may be ranked according to a reliability scores calculated for each registered token service 206. In these embodiments, operation 515 may also involve determining the set of token services to be registered token services 206 having a reliability score above a threshold reliability score; and/or determining the one or more token services 206 to be a predetermined number of registered token services 206 having reliability scores higher than reliability scores of other registered token services 206. Additionally, the reliability scores of each token service may be based on one or more of a total number of stored asset tokens, a number of stored asset tokens as compared to other registered token services, a number of validation challenges that have been executed, employed asset token registration processes, and/or protection measures employed by the token service 206. At operation 520, the registry 210 generates a list of the one or more token services 206, and at operation 525, the registry 210 sends a response message including the list of token services 206 to the requesting digital wallet 204. At operation 530 process 500*a* ends or repeats as necessary.

The registration process 500*b* begins at operation 535 where the registry 210 receives a registration request from an individual token service 206 for registering one or more asset classes, types, etc., with the registry 210. At operation 540, the registry 210 determines a reliability score for the individual asset token service 206 based on data items included in the registration request. In various embodiments, the data items included in the registration request indicate and/or include data of one or more of asset token classes, subclasses, kinds, types, or categories managed by the individual token service 206, validation procedures performed by individual token service 206 to validate asset ownership, one or more regulatory regimes, standards organizations, geographic or jurisdictional regions/areas, etc., supported by the individual token service 206, human languages supported by the individual token service 206, programming languages supported by the individual token service 206, and/or other token service related information. In these embodiments, the various data items may be the "value" of the token service 206 as discussed previously. At operation 545, the registry 210 stores the determined reliability score and the data items in association with an identifier of the individual asset token service 206 in the database of registered token services 206. At operation 550, the registry 210 generates and sends an acknowledgement message to the individual token service 206 indicating registration with the registry service. If the registration fails or is not permitted for some reason, at operation 550 the registry 210 may generate and send a negative acknowledgement message to the individual token service 206 to indicate error(s) and/or failure(s) in the registration process, and/or reasons why the registration was not possible. At operation 555 process 500*b* ends or repeats as necessary.

Referring now to FIG. 6, which shows an validation process 600 performed by a token service 206. Process 600 begins at operation 605 where the token service 206 receives a validation request from a requesting digital wallet 204 implemented by a user system 12. In embodiments, the validation request is a digitally signed request for validation of an owner of an asset token 202 (e.g., a user of owning wallet 208). In some embodiments, the token service 206 may validate the validation request, and append a block including the validation request to at least one blockchain in response to proper validation of the block and/or requesting wallet 204.

At operation 610, the token service 206 performs a lookup operation on one or more blockchains managed by the token service 206 to determine whether the asset token 202 is included in any of the one or more blockchains. The lookup operation may be a suitable query using one or more data items included in the validation request as query parameters, filters, conditions, and/or the like. Additionally or alternatively, if a potential owner name or identifier is included in the validation request, operation 610 involves performing a lookup operation to determine if the owner is listed in any of the blockchains. At operation 615, the token service 206 determines whether the asset token 202 (and/or owner name/ID) is included in at least one of the blockchains. If the token service 206 determines that the asset token 202 and/or owner 208 is not listed in any of the blockchains, the token service 206 proceeds to operation 650 to generate a validation response indicating that the asset token is not included in any of the blockchains, and sends the validation response to the requesting digital wallet 204 at operation 655.

If at operation 615 the token service 206 determines that the asset token 202 and/or owner 208 is listed in one or more blockchains, the token service 206 proceeds to open loop operation 620 process each listed/indicated owner of each identified asset token 202 in each blockchain. At operation 625, the token service 206 generates a notification to indicate the validation request, and at operation 630 the token service 206 sends the notification to the owner of the asset token 202. At close loop operation 635, the token service 206 proceeds back to operation 625 to generate and send another notification to the next identified owner (if any). Concurrently with generating and sending the notifications and/or after the notifications are generated and sent, at operation 640 the token service 206 receives responses to the notifications from respective owning digital wallets 208, where each received response indicates a respective privacy level for sharing data pertaining to the token 202, owning wallet 208, and/or the user of the owning wallet 208 with the requesting wallet 204. At operation 645 the token service 206 generates a validation response including an amount of data about the token 202, owning wallet 208, and/or the user of the owning wallet 208 based on the indicated privacy level. In some embodiments, a single validation response may be generated and sent, which includes information about all discovered asset tokens 202 and/or owners. In other embodiments, respective validation responses may be generated and sent in response to receipt of each notification, where each validation response includes information about asset token(s) 202 and/or owner indicated by the corresponding notification responses. At operation 655, the token service 206 sends the validation responses to the requesting wallet 208. At operation 660 process 600 ends or repeats as necessary.

Referring now to FIG. 7, which shows a registration process 700 performed by a token service 206. In embodiments, process 700 may be run before, after, simultaneously or concurrently with process 600 of FIG. 6. Process 700 begins at operation 705 where the token service 206 determines whether to register one or more asset classes, asset types, etc., with the registry 210. In some embodiments, the decision to register with the registry 210 may be based on content included in one or more received validation requests, such as the asset classes, types, etc., of the asset token 202 indicated by the request, a list of all token services 206 to which the validation request was posted, each token service 206 where an ownership search has been or is scheduled to be performed, and/or other token service-related information. Other parameters, conditions, policies, etc., may be used to determine whether to register with a particular registry 210. Additionally or alternatively, any suitable ML/AI approach could be used to decide when to register with one or more registries 210 and what asset classes, types, etc., to register with a particular registry 210. For example, clustering, deep learning, decision trees, support vector machines, genetic algorithms, federated learning, and/or other ML/AI techniques may be used to determine specific asset classes, types, etc., and/or specific registries 210 to register the token service 206. In another example, linear matrix factorization model, non-negative matrix factorization, or the like may be used to recommend registries 210 to register with based on the unique characteristics, patterns, features, etc., of the validation requests supplied by various wallets 204.

If at operation 705 the token service 206 determines to not register with the registry service 210, the token service 206 proceeds to operation 730 to end or repeat process 700. If at operation 705 the token service 206 determines to register with the registry service 210, the token service 206 proceeds to operation 710 to determine or identify the asset classes, types, etc., to be registered with the registry 210. In some embodiments, the asset classes, types, etc., to be registered with the registry 210 may be based on the content of one or more received validation requests and/or using the techniques discussed previously.

At operation 715, the token service 206 determines or identifies token service 206 value data. The value data may be the same or similar as discussed above, and may include, for example, validation procedures performed by the token service 206 to validate asset/token 202 ownership, one or more regulatory regimes, standards organizations, geographic or jurisdictional regions/areas, etc., supported by the token service 206, human languages supported by the token service 206, programming languages supported by the token service 206, and/or other token service related information. At operation 720, the token service 206 generates a registration request for registering the one or more asset classes with the registry 210. In embodiments, the registration request message may include data items for each of the determined asset classes, types, etc., each of the determined value data, a token service 206 identifier, and/or other like data/information. At operation 725, the token service 206 sends the registration request to the registration service 210. At operation 730, process 700 ends or repeats as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, for example, ORACLE®, DB2® by IBM®, and the like without departing from the scope of the implementations claimed.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C#, "C", Rust, Go (or "Golang"), JavaScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), Extensible Markup Language (XML), RESTful API Modeling Language (RAML), wiki markup or Wikitext, Wireless Markup Language (WML), Java Script Object Notion (JSON), Apache® MessagePack™ Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable storage media (NTCRSM) comprising instructions for providing blockchain services, wherein execution of the instructions is configurable to cause a computing system to:
   receive, from a digital wallet operated by a user system, a validation request requesting validation of an owner of an individual token, the validation request being is cryptographically signed;
   initiate, based on the cryptographically signed validation request, a search for the owner of the individual token within a set of blockchains that store tokens having a same asset type or asset class as the individual token;
   cause to append a block including the validation request to at least one blockchain of the set of blockchains in response to proper validation of the block; and
   send a response message to the digital wallet, wherein the response message includes ownership information at a level specified by the owner of the individual token;
   wherein, to determine the set of blockchains, execution of the instructions is configurable to cause the computing system to:
      determine an asset type or asset class of the individual token based on the validation request; and
      identify, from a database of registered blockchains, a superset of blockchains managing tokens having the same asset type or asset class as the individual token, wherein the set of blockchains are among the identified superset of blockchains;
      wherein each registered blockchain in the database are ranked according to reliability scores of each registered blockchain;
      determine, as the set of blockchains, blockchains from among the identified superset of blockchains having a reliability score above a threshold reliability score; or
      determine, as the set of blockchains, a predetermined number of registered blockchains from among the identified superset of blockchains having reliability scores higher than reliability scores of other registered blockchains in the database of registered blockchains;
      wherein the reliability scores are used for comparison of the blockchain services to other blockchain services.

2. The one or more NTCRSM of claim 1, wherein the reliability scores of each blockchain are based on a total number of stored tokens, a number of stored tokens as compared to other registered blockchains, a number of validation challenges that have been executed, employed token registration processes, and employed protection measures.

3. The one or more NTCRSM of claim 1, wherein execution of the instructions is configurable to cause the computing system to:
   receive a registration request from an individual blockchain;
   determine a reliability score for the individual blockchain based on data items included in the registration request, the data items included in the registration request indicate one or more of token classes, subclasses, kinds, types, or categories managed by the individual blockchain, validation procedures performed by the individual blockchain to validate asset ownership, regulatory regimes or standards organizations supported by the individual blockchain, human languages supported by the individual blockchain, or programming languages supported by the individual blockchain; and
   store, in the database of registered blockchains, the determined reliability score and the data items in association with an identifier of the individual blockchain.

4. A computing system to be employed as a blockchain service, the computing system comprising:
   a network interface configurable to receive, from a digital wallet operated by a user system, a validation request requesting validation of an owner of an individual token; and a processor system communicatively coupled with the network interface, the validation request being cryptographically signed, the processor system is configurable to:
   initiate, based on the cryptographically signed validation request, a search for the owner of the individual token within a set of blockchains that store tokens having a same asset type or asset class as the individual token,
   cause to append a block including the validation request to at least one blockchain of the set of blockchains in response to proper validation of the block, and
   cause the network interface to send a response message to the digital wallet, wherein the response message includes ownership information at a level specified by the owner of the individual token;
wherein, to determine the set of blockchains, the processor system is configurable to:
   determine an asset type or asset class of the individual token based on the validation request; and
   identify, from a database of registered blockchains, a superset of blockchains managing tokens having the same asset type or asset class as the individual token, wherein the set of blockchains are among the identified superset of blockchains;
   wherein each registered blockchain in the database are ranked according to reliability scores of each registered blockchain;
   determine, as the set of blockchains, blockchains from among the identified superset of blockchains having a reliability score above a threshold reliability score; or
   determine, as the set of blockchains, a predetermined number of registered blockchains from among the identified superset of blockchains having reliability scores higher than reliability scores of other registered blockchains in the database of registered blockchains;
   wherein the reliability scores are used for comparison of the blockchain services to other blockchain services.

5. The computing system of claim 4, wherein the reliability scores of each blockchain are based on a total number of stored tokens, a number of stored tokens as compared to other registered blockchains, a number of validation challenges that have been executed, employed asset token registration processes, and employed protection measures.

6. The computing system of claim 5, wherein:
   the network interface is configurable to receive a registration request from an individual blockchain; and
   the processor system is configurable to:
      determine a reliability score for the individual blockchain based on data items included in the registration request, the data items included in the registration request indicate one or more of asset token classes, subclasses, kinds, types, or categories managed by the blockchain, validation procedures performed by the blockchain to validate asset ownership, regulatory regimes or standards organizations supported by the blockchain, human languages supported by the blockchain, or programming languages supported by the blockchain, and
      store, in the database of registered blockchains, the determined reliability score and the data items in association with an identifier of the individual blockchain.

* * * * *